US009112694B2

United States Patent
Seo et al.

(10) Patent No.: US 9,112,694 B2
(45) Date of Patent: Aug. 18, 2015

(54) METHOD AND DEVICE FOR TRANSMITTING UPLINK ACKNOWLEDGEMENT INFORMATION IN A WIRELESS COMMUNICATION SYSTEM SUPPORTING MULTIPLE CARRIERS

(75) Inventors: Dong Youn Seo, Anyang-si (KR); Min Gyu Kim, Anyang-si (KR); Suck Chel Yang, Anyang-si (KR); Joon Kui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 169 days.

(21) Appl. No.: 13/580,064

(22) PCT Filed: Feb. 23, 2011

(86) PCT No.: PCT/KR2011/001210
§ 371 (c)(1),
(2), (4) Date: Aug. 20, 2012

(87) PCT Pub. No.: WO2011/105769
PCT Pub. Date: Sep. 1, 2011

(65) Prior Publication Data
US 2012/0314674 A1   Dec. 13, 2012

Related U.S. Application Data

(60) Provisional application No. 61/307,399, filed on Feb. 23, 2010, provisional application No. 61/329,074, filed on Apr. 28, 2010.

(51) Int. Cl.
*H04W 4/00* (2009.01)
*H04J 1/00* (2006.01)
*H04L 12/28* (2006.01)
*H04J 3/16* (2006.01)
(Continued)

(52) U.S. Cl.
CPC ............... *H04L 1/1861* (2013.01); *H04L 1/08* (2013.01); *H04L 1/1621* (2013.01); *H04L 1/1896* (2013.01); *H04L 1/201* (2013.01); *H04L 1/0072* (2013.01); *H04L 27/2601* (2013.01)

(58) Field of Classification Search
CPC ... H04L 5/0055; H04L 1/1854; H04L 1/0026; H04L 1/1621; H04L 1/1635; H04L 1/1861; H04L 1/1896; H04L 1/0073; H04L 1/1858; H04L 1/0053; H04L 1/001; H04W 72/0453; H04W 17/14

USPC ............... 370/329, 343, 431, 437; 455/450; 375/260
See application file for complete search history.

(56) References Cited

U.S. PATENT DOCUMENTS 8,345,605 B2 * 1/2013 Shen et al. ............... 370/329
2005/0286402 A1 12/2005 Byun et al.
(Continued)

FOREIGN PATENT DOCUMENTS

KR   10-2005-0114160 A   12/2005
KR   10-2009-0034254 A   4/2009
(Continued)

OTHER PUBLICATIONS

"3rd Generation Partnership Project; Technical Specification Group Radio Access Network; Evovled Universal Terrestrial Radio Access (E-UTRA); Physical layer Procedures (Release 9);" 3GPP TS 36.213 V9.0.1 (Dec. 2009).*

*Primary Examiner* — Alpus H Hsu
*Assistant Examiner* — Elton Williams
(74) *Attorney, Agent, or Firm* — Birch, Stewart, Kolasch & Birch, LLP

(57) ABSTRACT

The present invention relates to a wireless communication system, and more particularly, to a method and device for transmitting uplink acknowledgement information in a wireless communication system supporting multiple carriers. A method for a terminal for transmitting uplink acknowledgement information in a wireless communication system supporting multiple carriers according to one embodiment of the present invention includes: receiving downlink control information including downlink assignment index (DAI) information representing a combination of the number of downlink control channels ($n_{total}$) and a priority value ($n_{index}$); and transmitting the uplink acknowledgement information on the basis of the number of downlink control channels ($n_{total}$) and the priority value ($n_{index}$) that the DAI information represents. Here, the DAI information includes at least one DAI value, in which varying combinations of the number of downlink control channels ($n_{total}$) and the priority value ($n_{index}$) are overlapped and mapped.

11 Claims, 24 Drawing Sheets

(51) Int. Cl.
*H04W 72/00* (2009.01)
*H04L 27/28* (2006.01)
*H04L 1/18* (2006.01)
*H04L 1/08* (2006.01)
*H04L 1/16* (2006.01)
*H04L 1/20* (2006.01)
*H04L 1/00* (2006.01)
*H04L 27/26* (2006.01)

(56) References Cited

U.S. PATENT DOCUMENTS

2009/0318158 A1* 12/2009 Yamada et al. ............... 455/450
2010/0050059 A1* 2/2010 Cheng ........................... 714/786
2010/0165939 A1* 7/2010 Lin ................................ 370/329
2011/0002276 A1* 1/2011 Chen et al. .................... 370/329
2011/0032884 A1 2/2011 Yu et al.
2011/0096693 A1* 4/2011 Astely et al. .................. 370/252
2011/0116457 A1* 5/2011 Damnjanovic et al. ....... 370/329
2011/0128922 A1* 6/2011 Chen et al. .................... 370/329

FOREIGN PATENT DOCUMENTS

KR 10-2010-0017071 A 2/2010
WO WO 2009/045048 A2 4/2000

\* cited by examiner

FIG. 14

(a) index start=1

| n_total \ n_index | 1 | 2 | 3 | 4 | 5 |
|---|---|---|---|---|---|
| 1 | 0 | | | | |
| 2 | 1 | 2 | | | |
| 3 | 3 | 4 | 5 | | |
| 4 | 6 | 7 | 8 | 9 | |
| 5 | 10 | 11 | 12 | 13 | 14 |

(b) index start=0

| n_total \ n_index | 0 | 1 | 2 | 3 | 4 |
|---|---|---|---|---|---|
| 1 | 0 | | | | |
| 2 | 1 | 2 | | | |
| 3 | 3 | 4 | 5 | | |
| 4 | 6 | 7 | 8 | 9 | |
| 5 | 10 | 11 | 12 | 13 | 14 |

FIG. 15

| Previous RIV | | | | | |
|---|---|---|---|---|---|
| S \ L | 0 | 1 | 2 | 3 | 4 |
| 1 | 0 | 1 | 2 | 3 | 4 |
| 2 | 5 | 6 | 7 | 8 | |
| 3 | 10 | 11 | 12 | | |
| 4 | 14 | 13 | | | |
| 5 | 9 | | | | |

(a) index start=1

| n_total \ n_index | 1 | 2 | 3 | 4 | 5 |
|---|---|---|---|---|---|
| 5 | 0 | 1 | 2 | 3 | 4 |
| 4 | 5 | 6 | 7 | 8 | |
| 3 | 10 | 11 | 12 | | |
| 2 | 14 | 13 | | | |
| 1 | 9 | | | | |

(b) index start=0

| n_total \ n_index | 0 | 1 | 2 | 3 | 4 |
|---|---|---|---|---|---|
| 5 | 0 | 1 | 2 | 3 | 4 |
| 4 | 5 | 6 | 7 | 8 | |
| 3 | 10 | 11 | 12 | | |
| 2 | 14 | 13 | | | |
| 1 | 9 | | | | |

FIG. 16

(a) index start=1

| $n_{total}$ \ $n_{index}$ | 1 | 2 | 3 | 4 | 5 |
|---|---|---|---|---|---|
| 1 | 0 | | | | |
| 2 | 1 | 2 | | | |
| 3 | 3 | 4 | 5 | | |
| 4 | 6 | 7 | 8 | 9 | |
| 5 | 10 | 10 | 10 | 10 | 10 |

(b) index start=0

| $n_{total}$ \ $n_{index}$ | 0 | 1 | 2 | 3 | 4 |
|---|---|---|---|---|---|
| 1 | 0 | | | | |
| 2 | 1 | 2 | | | |
| 3 | 3 | 4 | 5 | | |
| 4 | 6 | 7 | 8 | 9 | |
| 5 | 10 | 10 | 10 | 10 | 10 |

FIG. 17

(a) index start=1

| $n_{total}$ \ $n_{index}$ | 1 | 2 | 3 | 4 | 5 |
|---|---|---|---|---|---|
| 1 | 0 | | | | |
| 2 | 1 | 2 | | | |
| 3 | 3 | 3 | 3 | | |
| 4 | 3 | 3 | 3 | 3 | |
| 5 | 3 | 3 | 3 | 3 | 3 |

$N_{th} = 3$ (b) index start=0

| $n_{total}$ \ $n_{index}$ | 0 | 1 | 2 | 3 | 4 |
|---|---|---|---|---|---|
| 1 | 0 | | | | |
| 2 | 1 | 2 | | | |
| 3 | 3 | 3 | 3 | | |
| 4 | 3 | 3 | 3 | 3 | |
| 5 | 3 | 3 | 3 | 3 | 3 |

(a) index start=1

| n_total \ n_index | 1 | 2 | 3 | 4 | 5 |
|---|---|---|---|---|---|
| 1 | 0 | | | | |
| 2 | 1 | 2 | | | |
| 3 | 3 | 4 | 5 | | |
| 4 | 6 | 6 | 6 | 6 | |
| 5 | 7 | 7 | 7 | 7 | 7 |

$N_{th} = 4$ (b) index start=0

| n_total \ n_index | 0 | 1 | 2 | 3 | 4 |
|---|---|---|---|---|---|
| 1 | 0 | | | | |
| 2 | 1 | 2 | | | |
| 3 | 3 | 4 | 5 | | |
| 4 | 6 | 6 | 6 | 6 | |
| 5 | 7 | 7 | 7 | 7 | 7 |

(a) index start=1

| n_total \ n_index | 1 | 2 | 3 | 4 | 5 |
|---|---|---|---|---|---|
| 1 | 0 | | | | |
| 2 | 1 | 2 | | | |
| 3 | 3 | 4 | 0 | | |
| 4 | 5 | 6 | 1 | 2 | |
| 5 | | | | | |

$N_{th, index} = 3$ (b) index start=0

| n_total \ n_index | 0 | 1 | 2 | 3 | 4 |
|---|---|---|---|---|---|
| 1 | 0 | | | | |
| 2 | 1 | 2 | | | |
| 3 | 3 | 4 | 0 | | |
| 4 | 5 | 6 | 1 | 2 | |
| 5 | | | | | |

$N_{th, index} = 2$

FIG. 20

(a) index start=1

| n_total \ n_index | 1 | 2 | 3 | 4 | 5 |
|---|---|---|---|---|---|
| 1 | 0 | | | | |
| 2 | 1 | 2 | | | |
| 3 | 3 | 4 | 3 | | |
| 4 | 5 | 6 | 5 | 6 | |
| 5 | | | | | |

$N_{th, index} = 3$ (b) index start=0

| n_total \ n_index | 0 | 1 | 2 | 3 | 4 |
|---|---|---|---|---|---|
| 1 | 0 | | | | |
| 2 | 1 | 2 | | | |
| 3 | 3 | 4 | 3 | | |
| 4 | 5 | 6 | 5 | 6 | |
| 5 | | | | | |

$N_{th, index} = 2$

METHOD AND DEVICE FOR TRANSMITTING UPLINK ACKNOWLEDGEMENT INFORMATION IN A WIRELESS COMMUNICATION SYSTEM SUPPORTING MULTIPLE CARRIERS

CROSS REFERENCE TO RELATED APPLICATIONS

This application is the National Phase of PCT/KR2011/001210 filed on Feb. 23, 2011, which claims priority under 35 U.S.C. 119(e) to U.S. Provisional Application Nos. 61/307,399 and 61/329,074 filed on Feb. 23, 2010 and Apr. 28, 2010 respectively, all of which are hereby expressly incorporated by reference into the present application.

TECHNICAL FIELD

The present invention relates to a wireless communication system, and more particularly, to a method of transmitting an uplink ACK/NACK (acknowledgement/negative-acknowledgement) information in a multi-carrier supportive wireless communication system and apparatus for the same.

BACKGROUND ART

Multi-carrier (multiple carriers) technology may be called a carrier aggregation technology. The multi-carrier technology provides an effect as if using a frequency bandwidth on a broadband logically in a manner of physically bundling a plurality of carriers together in frequency domain to support an extended bandwidth, unlike a conventional wireless communication system that uses a single carrier only in uplink/downlink (UL/DL).

Meanwhile, uplink (UL) control information may consist of scheduling request, acknowledgement/non-acknowledgement (ACK/NACK) for a downlink (DL) transmission, a downlink channel state information and the like. In a single-carrier system according to a related art, a user equipment receives DL data on a single carrier and then transmits an ACK (acknowledgement) signal, i.e., an ACK/NACK signal in response to the received DL data.

DISCLOSURE OF THE INVENTION

Technical Task

As a multi-carrier technology is introduced, it may be necessary to newly define a method for a single user equipment to receive a plurality of DL data on a plurality of DL carriers and then transmitting a UL ACK/NACK signal in response to the corresponding reception.

The technical task of the present invention is to provide a method and apparatus for a user equipment to transmit UL ACK/NACK signal accurately and efficiently in response to a DL transmission on a plurality of carriers in a multicarrier system. In particular, the technical task of the present invention is to provide a method and apparatus for a user equipment to reduce an information size of UL ACK/NACK transmitted by the user equipment in a manner of providing information (i.e., information indicating the number and order of DL control channels) necessary for the user equipment to transmit the UL ACK/NACK signal. And, the technical task of the present invention is to provide a method and apparatus for a user equipment to reduce control signaling overhead in a manner of decreasing a size of information (i.e., information indicating the number and order of DL control channels) necessary for the user equipment to transmit UL ACK/NACK signal.

Technical tasks obtainable from the present invention are non-limited the above-mentioned technical task. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of transmitting uplink acknowledgement/negative-acknowledgement (UL ACK/NACK) information, which is transmitted by a user equipment in a multicarrier supportive wireless communication system, according to one embodiment of the present invention may include the steps of receiving a downlink control information including a downlink assignment index (DAI) information indicating a combination of the number ($n_{total}$) of downlink control channels and an order value ($n_{index}$) of the downlink control channels and transmitting the UL ACK/NACK information based on the number ($n_{total}$) of the downlink control channels and the order value ($n_{index}$) of the downlink control channels indicated by the downlink assignment index information, wherein the downlink assignment index information comprises at least one downlink assignment index value having different combinations of the number ($n_{total}$) the downlink control channels and the order value ($n_{index}$) of the downlink control channels mapped duplicatively thereto.

To further achieve these and other advantages and in accordance with the purpose of the present invention, a method of transmitting downlink control information, which is transmitted by a base station in a multicarrier supportive wireless communication system, according to another embodiment of the present invention may include the steps of creating a downlink assignment index (DAI) information indicating a combination of the number ($n_{total}$) of downlink control channels and an order value ($n_{index}$) of the downlink control channels and transmitting a downlink control information including the created downlink assignment index information, wherein the number ($n_{total}$) of the downlink control channels and the order value ($n_{index}$) of the downlink control channels indicated by the downlink assignment index information is used for creation of uplink acknowledgement/negative-acknowledgement (UL ACK/NACK) information and wherein the downlink assignment index information comprises at least one downlink assignment index value having different combinations of the number ($n_{total}$) of the downlink control channels and the order value ($n_{index}$) of the downlink control channels mapped duplicatively thereto.

To further achieve these and other advantages and in accordance with the purpose of the present invention, a user equipment, which transmits uplink (UL) acknowledgement/negative-acknowledgement (ACK/NACK) information, according to another embodiment of the present invention may include a receiving module receiving a downlink signal from a base station, a transmitting module transmitting an uplink signal to the base station, and a processor controlling the user equipment including the receiving module and the transmitting module, the processor configured to receive a downlink control information including a downlink assignment index (DAI) information indicating a combination of the number ($n_{total}$) of downlink control channels and an order value ($n_{index}$) of the downlink control channels via the receiving module, the processor configured to transmit the UL ACK/NACK information via the transmitting module based on the number ($n_{total}$) of the downlink control channels and the order value ($n_{index}$) of the downlink control channels indicated by the downlink assignment index information, wherein the downlink assignment index information comprises at least one downlink assignment index value having different combinations of the number ($n_{total}$) of the downlink control channels and the order value ($n_{index}$) of the downlink control channels mapped duplicatively thereto.

To further achieve these and other advantages and in accordance with the purpose of the present invention, a base station, which transmits downlink control information in a multicarrier supportive wireless communication system, according to a further embodiment of the present invention may include a receiving module receiving an uplink signal from a user equipment, a transmitting module transmitting a downlink signal to the user equipment, and a processor controlling the base station including the receiving module and the transmitting module, the processor configured to create a downlink assignment index (DAI) information indicating a combination of the number ($n_{total}$) of downlink control channels and an order value ($n_{index}$) of the downlink control channels, the processor configured to transmit the downlink control information including the created downlink assignment index information, wherein the number ($n_{total}$) of the downlink control channels and the order value ($n_{index}$) of the downlink control channels indicated by the downlink assignment index information are used for creation of uplink acknowledgement/negative-acknowledgement (UL ACK/NACK) information in the user equipment and wherein the downlink assignment index information comprises at least one downlink assignment index value having different combinations of the number ($n_{total}$) of the downlink control channels and the order value ($n_{index}$) of the downlink control channels mapped duplicatively thereto.

The following matters may be applicable in common to the above-mentioned embodiments of the present invention.

Preferably, the downlink assignment index information may have a value of $DAI=n_{total}(n_{total}-1)/2+n_{index}-1$ if $n_{total}<N_{th}$, the downlink assignment index information may have a value of $DAI=N_{th}(N_{th}-1)/2+n_{total}-N_{th}$ if $n_{total} \geq N_{th}$, the $N_{th}$ may be a previously determined natural number, and the order value ($n_{index}$) of the downlink control channel may have a value corresponding to one of 1, 2, . . . , and $n_{index}$.

Preferably, if the downlink assignment index information indicates that the number ($n_{total}$) of the downlink control channels is a maximum number and the user equipment receives one downlink control channel, the UL ACK/NACK information may be transmitted via an uplink control channel resource corresponding to a control channel element index of the one downlink control channel.

Preferably, the number ($n_{total}$) of the downlink control channels may include a value amounting to a sum of the number of the downlink control channels assigning downlink data channels and the number of the downlink control channels requiring ACK/NACK for whether the corresponding downlink control channel is detected.

More preferably, when the downlink control channel assigns the downlink data channels, the UL ACK/NACK information may be created based on whether the downlink data channel is received.

Preferably, the number ($n_{total}$) of the downlink control channels may include a value amounting to a sum of the number of downlink data channels and the number of the downlink control channels requiring ACK/NACK for whether the corresponding downlink control channel is detected.

Preferably, the number ($n_{total}$) of the downlink control channels may include a value amounting to a sum of the number of downlink data channels assigning downlink data channels, the number of the downlink data channels scheduled without the downlink control channels, and the number of the downlink control channels requiring ACK/NACK for whether the corresponding downlink control channel is detected.

More preferably, the downlink data channel scheduled without the downlink control channel may include the downlink data channel scheduled by semi-persistent scheduling (SPS).

Preferably, the number ($n_{total}$) of the downlink control channels may include the number of the downlink control channels transmitted to the user equipment in a prescribed time interval.

The above-mentioned general description of the present invention and the following details of the present invention are exemplary and may be provided for the additional description of the invention disclosed in claims.

Advantageous Effects

According to the present invention, provided are a method and apparatus for a user equipment to transmit UL ACK/NACK signal accurately and efficiently in response to a DL transmission on a plurality of carriers in a multicarrier system, to reduce an information size of UL ACK/NACK transmitted by the user equipment in a manner of providing information (i.e., information indicating the number and order of DL control channels) necessary for the user equipment to transmit the UL ACK/NACK signal, and to reduce control signaling overhead in a manner of decreasing a size of information (i.e., information indicating the number and order of DL control channels) necessary for the user equipment to transmit UL ACK/NACK signal.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 14 is a diagram for one example of DAI field according to a $2^{nd}$ embodiment of the present invention.

FIG. 15 is a diagram for another example of DAI field according to a $2^{nd}$ embodiment of the present invention.

FIG. 16 is a diagram for one example of DAI field according to a $3^{rd}$ embodiment of the present invention.

FIG. 17 is a diagram for one example of DAI field according to a $4^{th}$ embodiment of the present invention.

FIG. 18 is a diagram for one example of DAI field according to a $5^{th}$ embodiment of the present invention.

FIG. 19 is a diagram for one example of DAI field according to a $6^{th}$ embodiment of the present invention.

FIG. 20 is a diagram for another example of DAI field according to a $6^{th}$ embodiment of the present invention.

BEST MODE FOR INVENTION

Figure 1:
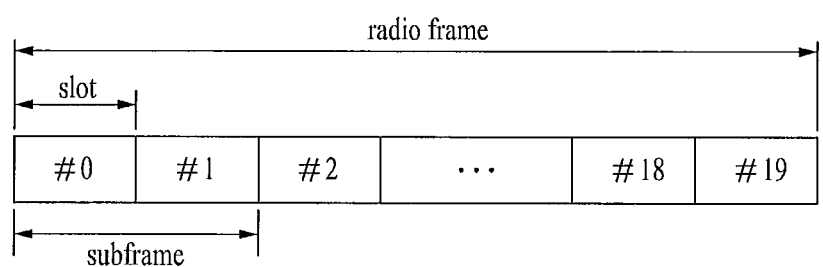
FIG. 1 is a diagram for a structure of a type-1 radio frame.

First of all, the following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

In this specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases.

In particular, in a network constructed with a plurality of network nodes including a base station, it is apparent that various operations performed for communication with a terminal can be performed by a base station or other networks except the base station. 'Base station (BS)' may be substituted with such a terminology as a fixed station, a Node B, an eNode B (eNB), an access point (AP) and the like. A terminology called a base station may be conceptionally usable as including a cell or sector. And, a terminology called a cell may mean a base station unless mentioned especially. Meanwhile, a relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS) and the like.

Specific terminologies used for the following description may be provided to help the understanding of the present invention. And, the use of the specific terminology may be modified into other forms within the scope of the technical idea of the present invention.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention may be supported by the disclosed standard documents of at least one of wireless access systems including IEEE 802 system, 3GPP system, 3GPP LTE and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/CPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE system or 3GPP LTE-A system, by which the technical idea of the present invention may be non-limited.

Structures of radio frames are described with reference to FIG. 1 and FIG. 2 as follows.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 1 is a diagram for a structure of a downlink radio frame of type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and a plurality of resource blocks (RBs) in frequency domain.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

Figure 2:
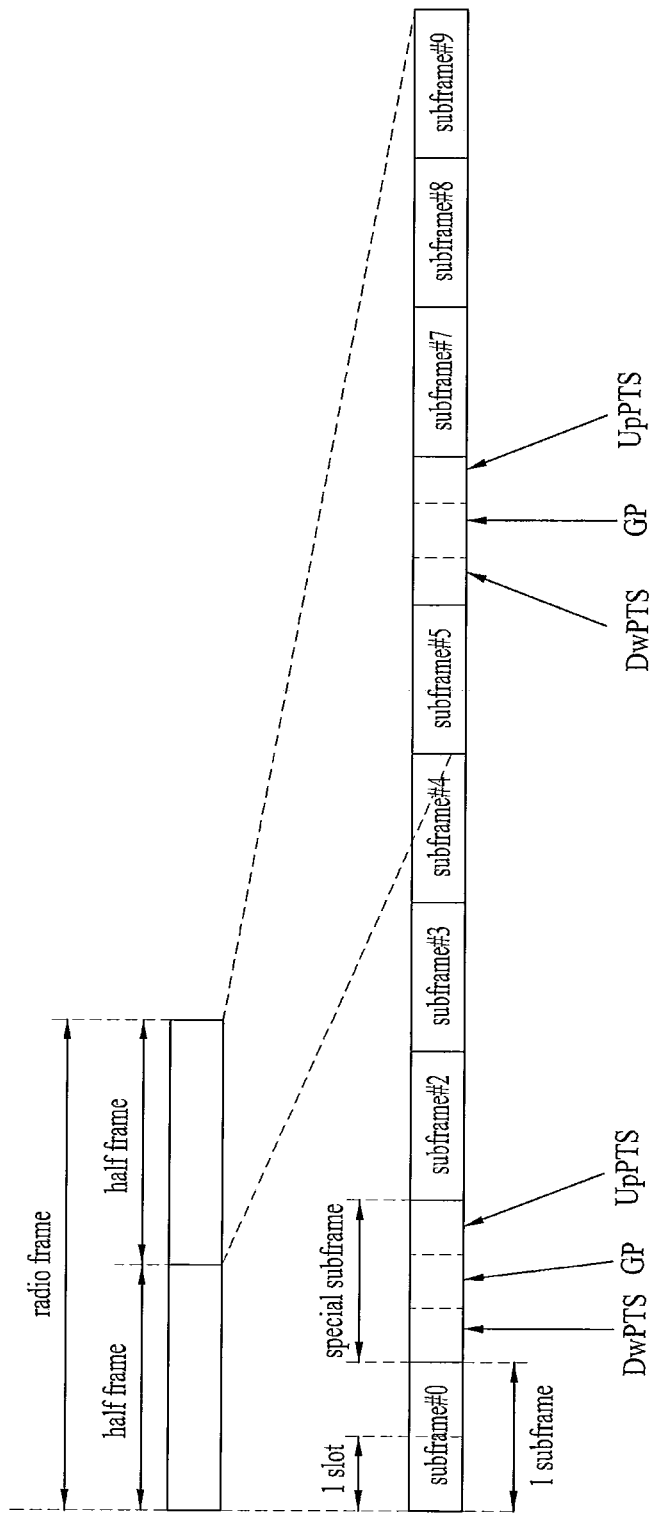
FIG. 2 is a diagram for a structure of a type-2 radio frame.

FIG. 2 is a diagram for a structure of a downlink radio frame of type 2. A type-2 radio frame includes 2 half frames. Each of the half frames includes 5 subframes. The subframes may be classified into a normal subframes and a special subframe. The special subframe is the subframe that includes 3 fields of DwPTS (downlink pilot time slot), GP (gap period) and UpPTS (uplink pilot time slot). Lengths of the 3 field may be individually set up but a total length of the 3 fields should be 1 ms. One subframe includes 2 slots. In particular, 1 subframe includes 2 slots irrespective of a type of a radio frame.

The above-described structures of the radio frames are just exemplary. And, the number of subframes included in a radio frame, the number of slots included in the subframe and the number of symbols included in the slot may be modified in various ways.

Figure 3:
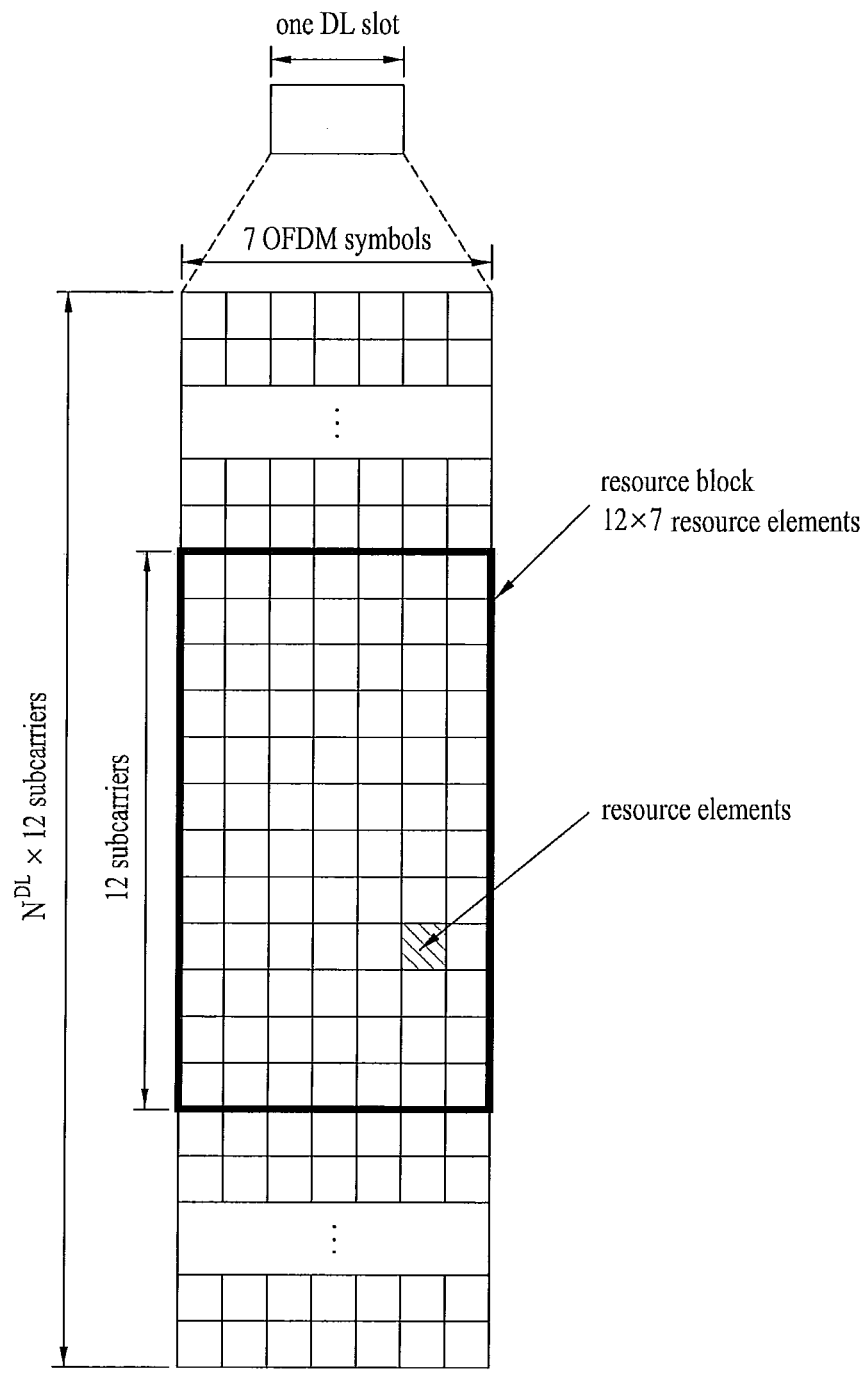
FIG. 3 is a diagram for one example of a resource grid in a downlink slot.

FIG. 3 is a diagram for one example of a resource grid for a downlink (DL) slot. One downlink (DL) slot may include 7 OFDM symbols in time domain and one resource block (RB) may include 12 subcarriers in frequency domain, by which the present invention may be non-limited. For instance, in case of a normal cyclic prefix (CP), one slot includes 7 OFDM symbols. Yet, in case of an extended CP, one slot may include 6 OFDM symbols. Each element on a resource grid may be named a resource element (hereinafter abbreviated RE). One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 4:
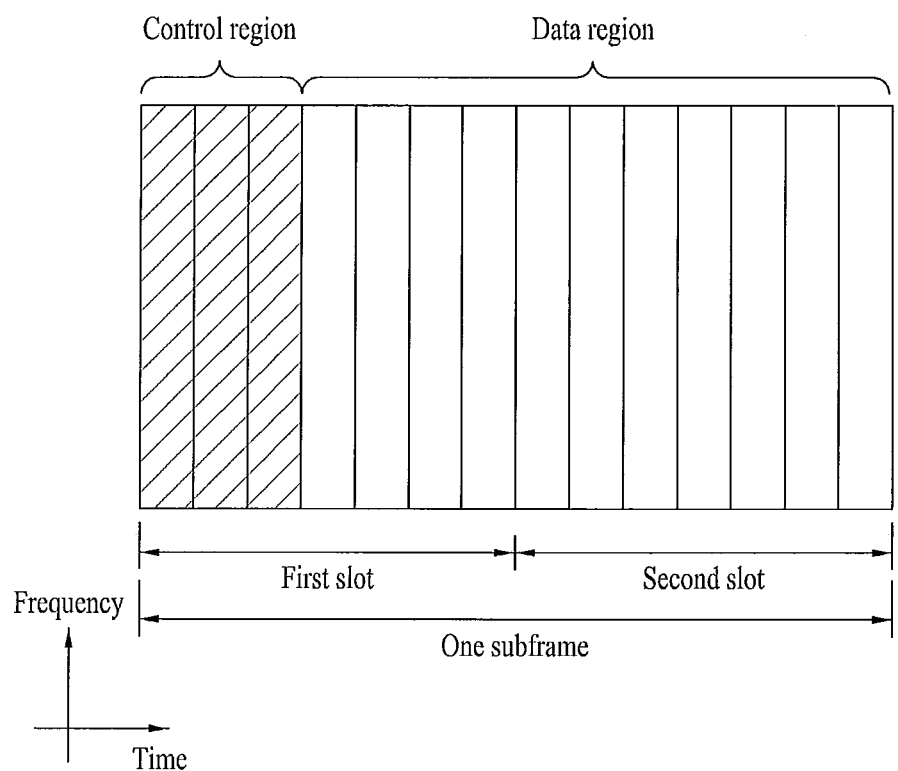
FIG. 4 is a diagram for a structure of a downlink subframe.

FIG. 4 is a diagram for a structure of a downlink (DL) subframe. Maximum 3 OFDM symbols situated in a head part of a first slot of one subframe correspond to a control region to which a control channel is allocated. The rest of OFDM symbols correspond to a data region to which PDSCH (physical downlink shared channel) is allocated. A basic unit of transmission becomes one subframe. In particular, PDCCH and PDSCH are assigned across 2 slots. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH includes HARQ ACK/NACK signal in response to a UL transmission. Control information carried on PDCCH may be called downlink control information (DCI). The DCI may include UL or DL scheduling information or a UL transmission power control command for a random UE (user equipment) group. The PDCCH may include transmission format and resource allocation information of DL-SCH (downlink shared channel), resource allocation information on UL-SCH (uplink shared channel), paging information on PCH (paging channel), system information on DL-SCH, resource allocation of such a higher layer control message as a random access response transmitted on PDSCH, transmission power control command set for individual UEs within a random UE group, transmission power control information, activation of VoIP (voice over IP) and the like. A plurality of PDCCHs can be transmitted within the control region. A user equipment may be able to monitor a plurality of the PDCCHs. The PDCCH is transmitted as an aggregation of at least one or more contiguous CCEs (control channel elements). The CCE is a logical allocation unit used to provide the PDCCH at a coding rate based on a radio channel status. The CCE may correspond to a plurality of REGs (resource element groups). A format of the PDCCH and the number of available PDCCH bits may be determined in accordance with correlation between the number of CCEs and a coding rate provided by the CCE. A base station determines a PDCCH format in accordance with a DCI which is to be transmitted to a user equipment and attaches a CRC (cyclic redundancy check) to control information. The CRC is masked with an identifier named RNTI (radio network temporary identifier) in accordance with an owner or usage of the PDCCH. For instance, if the PDCCH is provided for a specific user equipment, the CRC may be masked with an identifier (e.g., cell-RNTI (C-RNTI)) of the corresponding user equipment. In case that the PDCCH is provided for a paging message, the CRC may be masked with a paging indicator identifier (e.g., P-RNTI). If the PDCCH is provided for system information (particularly, for a system information block (SIB)), the CRC may be masked with a system information identifier and a system information RNTI (SI-RNTI). In order to indicate a random access response to a transmission of a random access preamble of a user equipment, the CRC may be masked with RA-RNTI (random access-RNTI).

Figure 5:
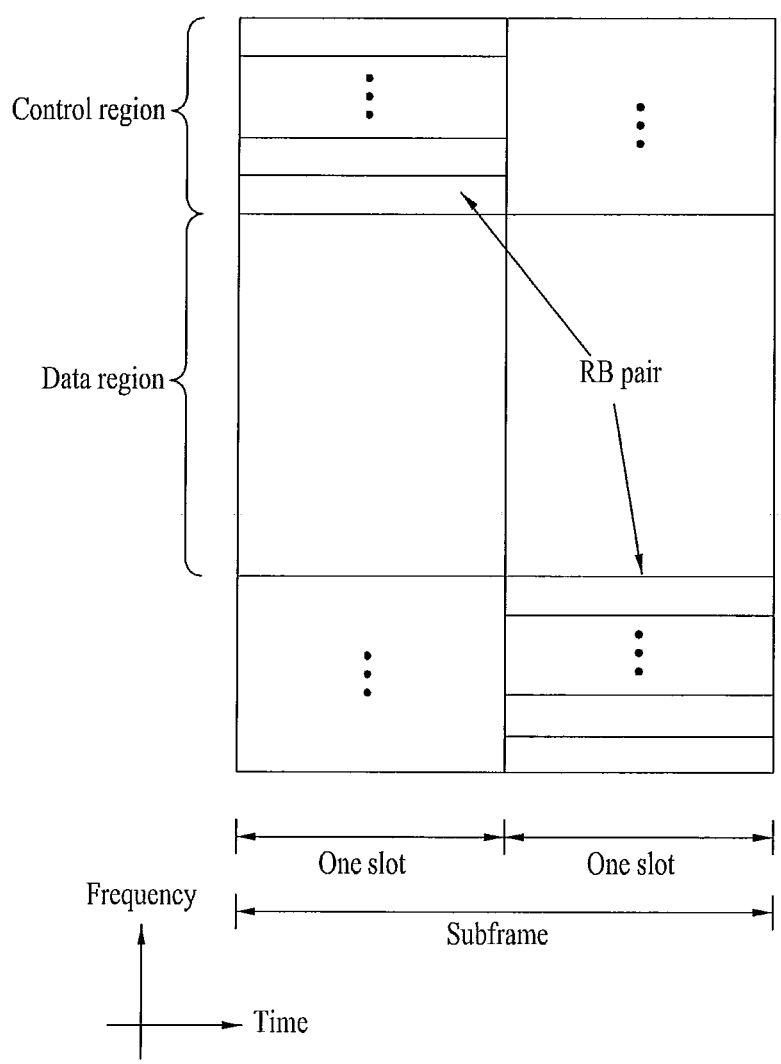
FIG. 5 is a diagram for a structure of an uplink subframe.

FIG. 5 is a diagram for a structure of an uplink (UL) subframe. A UL subframe may be divided into a control region and a data region in frequency domain. A physical UL control channel (PUCCH) including UL control information may be allocated to the control region. And, a physical UL shared channel (PUSCH) including user data may be allocated to the data region. In order to maintain single carrier property, one user equipment does not transmit PUCCH and PUSCH simultaneously. PUCCH for one user equipment may be allocated to a resource block pair (RB pair) in subframe. Resource blocks belonging to the resource block pair may occupy different subcarriers for 2 slots. Namely, a resource block pair allocated to PUCCH is frequency-hopped on a slot boundary.

Multicarrier Technology

Carrier aggregation is introduced to support an increasing throughput, prevent a cost increase due to an introduction of a wideband RF device, and secure compatibility with a legacy system. Carrier aggregation is the technology for enabling data to be exchanged between a user equipment and a base station through a plurality of bundles of carriers by bandwidth unit defined in a legacy wireless communication (e.g., LTE system in case of LTE-A system, IEEE 802.16e system in case of IEEE 802.16m system). In this case, a carrier of a bandwidth unit defined in a legacy wireless communication system may be called a component carrier (hereinafter abbreviated CC). For instance, the carrier aggregation technology may include a scheme of supporting a system bandwidth up to maximum 100 MHz by making a bundle of maximum 5 CCs despite that one CC supports a bandwidth of 5 MHz, 10 MHz or 20 MHz.

Downlink component carrier may be represented as DL CC and UL component carrier may be represented as UL CC. A carrier or a component carrier may be represented as a cell in aspect of functional configuration. Hence, DL CC and UL CC may be represented as DL cell and UL cell, respectively. In the following description of the present invention, a plurality of carriers having carrier aggregation applied thereto may be represented as a component carrier (CC).

Figure 6:
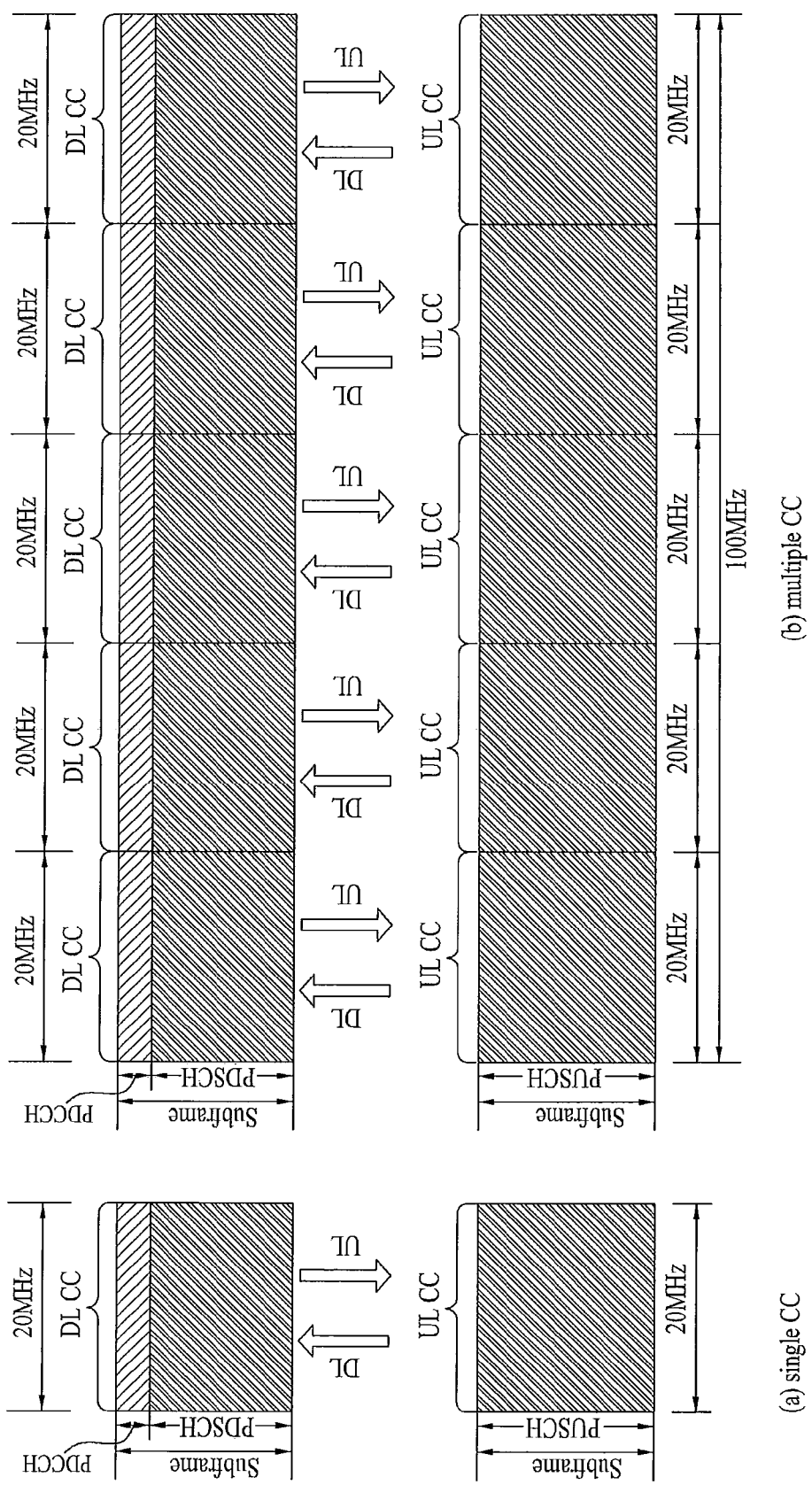
FIG. 6 is a conceptional diagram of component carriers (CCs) for uplink and downlink.

FIG. 6 is a conceptional diagram of component carriers (CCs) in downlink and component carriers (CCs) in uplink. In a general FDD wireless mobile communication system, data transmission and reception can be performed via one DL band and one UL band corresponding to the one DL band. Meanwhile, in a multicarrier supportive wireless communication system, it may be able to support wider UL/DL bandwidths by combining a plurality of component carriers (CCs) in UL/DL. FIG. 6 (b) shows one example of supporting total 100 MHZ bandwidth by combining 5 component carriers (CCs) each of which has maximum 20 MHz bandwidth.

After a step (e.g., a cell search procedure, a system information acquisition/reception procedure, an initial random access procedure, etc.) of establishing an RRC connection has been performed on each of DL and UL based upon a single random CC through an initial access or initial deployment process by a user equipment, a carrier configuration unique to each user equipment may be received from a base station via a dedicated signaling (e.g., a UE-specific RRC signaling, a UE-specific L1/L2 PDCCH signaling, etc.). Alternatively, when carrier configuration for a user equipment is accomplished in common by a base station (cell or cell cluster) unit, the carrier configuration may be provided via a cell-specific RRC signaling or a cell-specific UE-common L1/L2 PDCCH signaling. Alternatively, carrier configuration information configured by a base station may also be signaled to a user equipment via system information for the RRC connection establishment or may be signaled to the user equipment via separate system information or a cell-specific RRC signaling after completion of the RRC connection establishing step.

In this disclosure, DL/UL CC configuration is described by being focused upon the relation between a base station and a user equipment, by which the present invention may be non-limited. For example, for a user equipment located in a relay node area, the description given herein may be identically applicable to the case that a relay node provides DL/UL CC configurations of a corresponding user equipment. Also, for a relay node located in a base station area, the description given herein may also be identically applicable to the case that the base station provides the DL/UL CC configurations of the corresponding relay node. Hereinafter, the DL/UL CC configurations are described in a manner of being focused upon the relation between the base station and the user equipment, for clarity. Nevertheless, it will be apparent that the same description may be identically applicable between a relay node and a user equipment or between a base station and a relay node.

In the course of uniquely assigning DL/UL CCs to an individual user equipment, DL/UL CC linkage may be implicitly established, or may be explicitly established in conjunction with the definition of random signaling parameters.

Figure 7:
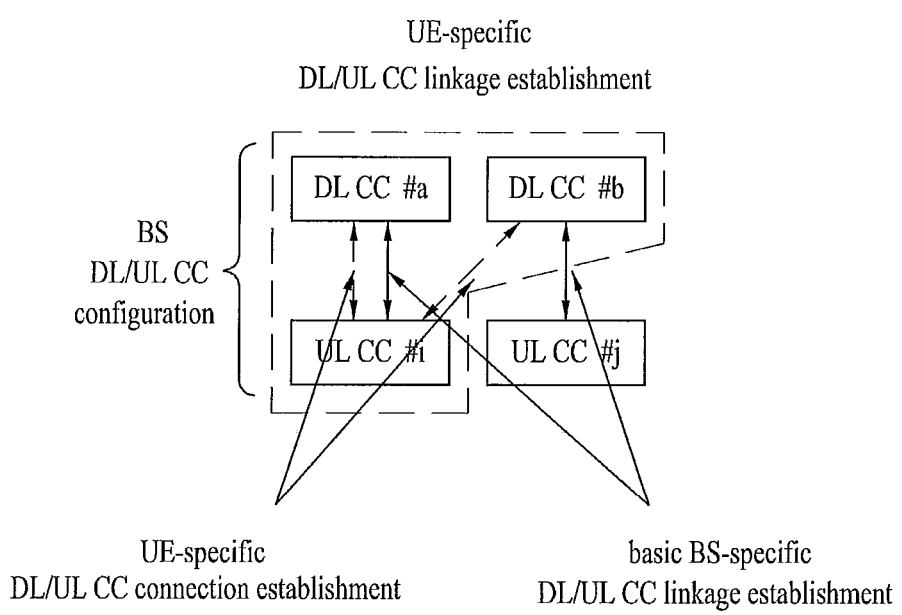
FIG. 7 is a diagram for one example of DL/UL CC linkage.

FIG. 7 is a diagram for one example of DL/UL CC linkage. When a base station configures CCs with 2 downlink CCs (DL CC #a and DL CC #b) and 2 uplink CCs (UL CC #i and UL CC #j), FIG. 7 shows one example of DL/UL CC linkage, which is defined in a manner that 2 downlink CCs (DL CC #a and DL CC #b) and 1 uplink CC (UL CC #i) are assigned to a random user equipment. In the DL/UL CC linkage shown in FIG. 7, the solid lines indicate the linkage configuration between the DL CCs and the UL CCs configured by a base station, which may be defined in SIB 2. In the DL/UL CC linkage shown in FIG. 7, the dotted lines indicate a linkage establishment between DL CCs and UL CCs that are configured for a specific user equipment. The establishment of the linkage between DL CC and UL CC in FIG. 7 is just exemplary, by which the present invention may be non-limited. In particular, according to various embodiments of the present invention, it will be apparent that the numbers of DL CCs and UL CCs configured by a base station can be set to random values, that the numbers of DL CCs and UL CCs being UE-specifically configured or assigned among the above-configured DL and UL CCs may be set to random values, and that DL/UL CC linkage associated with the settings may also be defined by a method other than the method shown in FIG. 7.

Among DL and UL CCs configured or set up for a random user equipment, it may be able to configure a primary component carrier (PCC) (or a primary cell (P-cell)) or an anchor component carrier (anchor CC) (or anchor cell). For instance, it may be able to configure DL PCC (or DL P-cell) for the purpose of a transmission of configuration/reconfiguration information on RRC connection establishment. For another instance, it may be able to configure UL PCC (or UL P-cell) that carries PUCCH to transmit UCI supposed to be transmitted in UL by a random user equipment. Basically, one DL PCC (P-cell) and one UL PCC (P-cell) are configured specific to each user equipment. Alternatively, in case that a considerable amount of CCs are configured for a user equipment or that CCs are configured by a plurality of base stations, one DL PCC (P-cell) or a plurality of DL PCCs (P-cells) and/or one UL PCC (P-cell) or a plurality of UL PCCs (P-cells) can be configured for a random user equipment by one or more base stations. First of all, it may be able to consider a method for a base station to arbitrarily establish UE-specific linkage between DL PCC (P-cell) and UL PCC (P-cell). On the other hand, as a further simplified method, it may be able to establish linkage between DL PCC (P-cell) and UL PCC (P-cell) based on the relation of the basic linkage signaled by SIB (system information block (or base)) already defined in LTE Release-8 (Rel-8). The linkage-established DL PCC (P-cell) and UL PCC (P-cell) are combined together to be represented as UE-specific P-cell.

Meanwhile, in a multicarrier system, it may apply cross-carrier scheduling thereto. In particular, the cross-carrier scheduling means a case that control information (UL grant PDCCH) for scheduling a PUSCH transmission on UL CC #j is transmitted on DL CC (DL CC #a) other than the DL CC (e.g., DL CC #b) linked with the UL CC #j when control information (DL channel assignment PDCCH) for scheduling a PDSCH transmission on DL CC #b is transmitted on DL CC (DL CC #a) other than the DL CC #b. On the other hand, if DL assignment PDCCH for a PDSCH transmission on DL CC #b is transmitted or DL CC #b or UL grant PDCCH for a PUSCH transmission on UL CC #j is transmitted on DL CC #b linked with the UL CC #j, it may mean a case that is not cross-carrier scheduled. This cross-carrier scheduling may be configured UE-specific or UE-common (i.e., cell-specific) within a cell.

Resource Allocation

Figure 8:
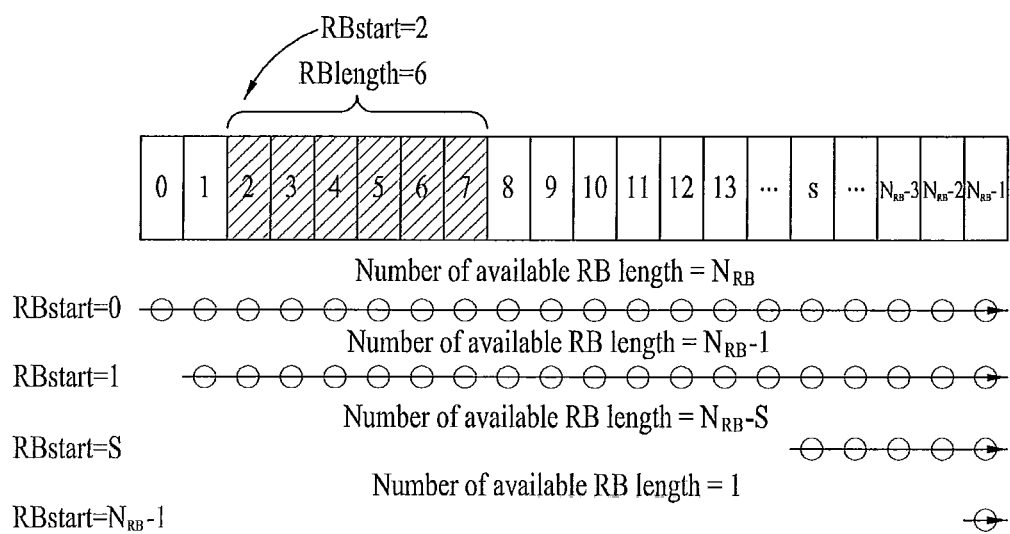
FIG. 8 is a diagram to describe resource allocation indicated to a user equipment.

FIG. 8 is a diagram to describe resource allocation indicated to a user equipment. First of all, control information on this resource allocation may be provided to a user equipment via PDCCH DL control information (DCI) format and may indicate an allocation of a physical resource block or an allocation of a virtual resource block in accordance with a resource allocation type. FIG. 8 shows a method of allocating contiguous frequency resources for a UL or DL transmission scheduled for a user equipment.

When allocation of contiguous frequency resources shown in FIG. 8 is notified to a user equipment for example, Table 1 shows a method of signaling a compact scheme of indicating a start point s of RB, which is a basic unit of resource allocation, and the number (=length, L) of RBs. The information field for resource block allocation may include RIV (resource indication value) shown in Table 1. And, the RB start point and the number (or length) of contiguously allocated RBs may be derived from the RIV. In Table 1, indicates floor (x) operation and $\lfloor x \rfloor$ means a maximum integer not greater than x.

TABLE 1 if $L-1 \leq \lfloor N_{RB}/2 \rfloor$ then
$\quad RIV = N_{RB}(L-1)+S$
else
$\quad RIV = N_{RB}(N_{RB}-L+1)+(N_{RB}-1-S)$
End
Required bits
$\quad N_{bit\_required} = \lceil \log_2(RIV_{max}+1) \rceil$
$\quad$ Without limitation
$\quad\quad RIV_{max} = N_{RB} \cdot (N_{RB}+1)/2-1$
$\quad$ With limitation $L^{Limit}$
$\quad\quad RIV_{max} = \min\{N_{RB} \cdot (N_{RB}+1)/2-1, N_{RB}(L^{limit}-1)+N_{RB}-L^{limit}\}$ Referring to Table 1, for example, total frequency resources available for a scheduling of UL or DL transmission may be configured with $N_{RB}$ (0, . . . , $N_{RB}-1$) resource blocks (RBs). The frequency resource allocated to a user equipment may be notified to the user equipment via a start point (RBstart; S) of a resource block and a length (RBlength; L) of the RB. The number of cases for configuring a resource allocation (or the number of hypotheses) is $N_{RB}(N_{RB}+1)/2$ and the number of cases required for representing allocated RB (or the number of hypotheses) is ceiling($\log_2 (N_{RB}+N_{RB}+1)/2$). In this case, the ceiling(x) means a minimum integer not smaller than x. Referring to FIG. 8, if S is 0, the number of available RB length is $N_{RB}$. If S is 1, the number of available RB length is $N_{RB}-1$. If S is $N_{RB}-1$, the number of available RB length is 1. In particular, the start point S of the resource allocation may have a value set to $0 \leq S \leq N_{RB}-1$ and the number L of allocable RB length may be represented as $N_{RB}-S$. Alternatively, in another aspect, the allocable RB length L may have a value set to $1 \leq L \leq N_{RB}$ and the resource allocation start point may be represented as $N_{RB}-L$.

In case of configuring a bit field of scheduling control information with reference to a binary number of a maximum value of each value without considering combination possibility in accordance with the values S and L, since it is '20<$2^5$' when $N_{RB}$=20, total 10 bits are required for S and L each (i.e., 5 bits for 5 and 5 bits for L). Yet, this bit field configuration includes the combinations, which does not occur actually, and may cause the increase of the number of transmission bits unnecessarily. Hence, in order to decrease the number of the transmission bits, the possible combinations of the values S and L are represented as RIV and the binary representation of the RIV may be then transmitted. For instance, if $N_{RB}$=20, the possible combinations of S and L may be represented as Table 2. In Table 2, if S=0, it is $1 \leq L \leq 20$. If S=1, it is $1 \leq L \leq 19$. If S=2, it is $1 \leq L \leq 18$. If S=18, it is $1 \leq L \leq 2$. If S=19, it is L=1. In particular, a part indicated by the hatching in Table 2 corresponds to the impossible combination of S and L.

When RIV value is configured in the above manner, if $L-1 \leq \lfloor N_{RB}/2 \rfloor$, RIV of the hatched part in Table 2 is mapped to RIV of $L-1 \leq \lfloor N_{RB}/2 \rfloor$. Hence, it may be able to use the RIV without waste. For instance, if $N_{RB}$=20, RIV of the parts of RIVs corresponding to $L \leq \lfloor N_{RB}/2 \rfloor+1=\lfloor 20/2 \rfloor+1=11$ in the hatched region may be reusable for the part corresponding to $L \leq \lfloor N_{RB}/2 \rfloor+1 \lfloor 20/2 \rfloor+1=11$ in the rest of the region. In this case, a maximum value of RIV indicating the possible combination of S and L may become 209.

If the RIV values are configured in the above manner, the transmission bit number depends on the maximum value of RIV. And, the RIV equal to or smaller than the maximum value of RIV may be configured not to be mapped to a value failing in configuring a possible combination of S and L. In particular, all values equal to or smaller than the RIV maximum value may correspond to all possible combinations of S and L. Hence, since the possible combinations of S and L can be represented as 209 (=$N_{RB}(N_{RB}+1)/2-1$, where $N_{RB}$=20) states, the RIV may be represented as 8 bits only.

TABLE 2

| L\S | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 1 | 0 | 1 | 2 | 3 | 4 | 5 | 6 | 7 | 8 | 9 | 10 | 11 | 12 | 13 | 14 | 15 | 16 | 17 | 18 | 19 |
| 2 | 20 | 21 | 22 | 23 | 24 | 25 | 26 | 27 | 28 | 29 | 30 | 31 | 32 | 33 | 34 | 35 | 36 | 37 | 38 | 39 |
| 3 | 40 | 41 | 42 | 43 | 44 | 45 | 46 | 47 | 48 | 49 | 50 | 51 | 52 | 53 | 54 | 55 | 56 | 57 | 58 | 59 |
| 4 | 60 | 61 | 62 | 63 | 64 | 65 | 66 | 67 | 68 | 69 | 70 | 71 | 72 | 73 | 74 | 75 | 76 | 77 | 78 | 79 |
| 5 | 80 | 81 | 82 | 83 | 84 | 85 | 86 | 87 | 88 | 89 | 90 | 91 | 92 | 93 | 94 | 95 | 96 | 97 | 98 | 99 |
| 6 | 100 | 101 | 102 | 103 | 104 | 105 | 106 | 107 | 108 | 109 | 110 | 111 | 112 | 113 | 114 | 115 | 116 | 117 | 118 | 119 |
| 7 | 120 | 121 | 122 | 123 | 124 | 125 | 126 | 127 | 128 | 129 | 130 | 131 | 132 | 133 | 134 | 135 | 136 | 137 | 138 | 139 |
| 8 | 140 | 141 | 142 | 143 | 144 | 145 | 146 | 147 | 148 | 149 | 150 | 151 | 152 | 153 | 154 | 155 | 156 | 157 | 158 | 159 |
| 9 | 160 | 161 | 162 | 163 | 164 | 165 | 166 | 167 | 168 | 169 | 170 | 171 | 172 | 173 | 174 | 175 | 176 | 177 | 178 | 179 |
| 10 | 180 | 181 | 182 | 183 | 184 | 185 | 186 | 187 | 188 | 189 | 190 | 191 | 192 | 193 | 194 | 195 | 196 | 197 | 198 | 199 |
| 11 | 200 | 201 | 202 | 203 | 204 | 205 | 206 | 207 | 208 | 209 | 210 | 211 | 212 | 213 | 214 | 215 | 216 | 217 | 218 | 219 |
| 12 | 199 | 198 | 197 | 196 | 195 | 194 | 193 | 192 | 191 | 190 | 189 | 188 | 187 | 186 | 185 | 184 | 183 | 182 | 181 | 180 |
| 13 | 179 | 178 | 177 | 176 | 175 | 174 | 173 | 172 | 171 | 170 | 169 | 168 | 167 | 166 | 165 | 164 | 163 | 162 | 161 | 160 |
| 14 | 159 | 158 | 157 | 156 | 155 | 154 | 153 | 152 | 151 | 150 | 149 | 148 | 147 | 146 | 145 | 144 | 143 | 142 | 141 | 140 |
| 15 | 139 | 138 | 137 | 136 | 135 | 134 | 133 | 132 | 131 | 130 | 129 | 128 | 127 | 126 | 125 | 124 | 123 | 122 | 121 | 120 |
| 16 | 119 | 118 | 117 | 116 | 115 | 114 | 113 | 112 | 111 | 110 | 109 | 108 | 107 | 106 | 105 | 104 | 103 | 102 | 101 | 100 |
| 17 | 99 | 98 | 97 | 96 | 95 | 94 | 93 | 92 | 91 | 90 | 89 | 88 | 87 | 86 | 85 | 84 | 83 | 82 | 81 | 80 |
| 18 | 79 | 78 | 77 | 76 | 75 | 74 | 73 | 72 | 71 | 70 | 69 | 68 | 67 | 66 | 65 | 64 | 63 | 62 | 61 | 60 |
| 19 | 59 | 58 | 57 | 56 | 55 | 54 | 53 | 52 | 51 | 50 | 49 | 48 | 47 | 46 | 45 | 44 | 43 | 42 | 41 | 40 |
| 20 | 39 | 38 | 37 | 36 | 35 | 34 | 33 | 32 | 31 | 30 | 29 | 28 | 27 | 26 | 25 | 24 | 23 | 22 | 21 | 20 |

Meanwhile, if the maximum value ($=L^{limit}$) of the number of RBs allocable in the RIV configuration is limited, as shown in the bottom part of Table 1, i.e., if L is supposed to have a limited value equal to or smaller than $L^{limit}$, the number of bits required for the representation of S & L combination may decrease. For instance, if $L^{limit}=6$ in Table 2, a range of possible L value is given as $1 \le L \le 6$ and a combination having a range of the L value set to $7 \le L \le 20$ is not used. Hence, it can be confirmed that a maximum value of the corresponding RIV value is 114. In particular, since a range of generative RIV is given as $0 \le RIV \le 114 < 2^7$, it may result in '$N_{bit\_required\_lim}=7$ bits'.

Semi-Persistent Scheduling

Semi-persistent scheduling means a scheduling scheme of designating subframes SPS transmittable/receivable in UL or DL to a user equipment by RRC (radio resource control) signaling and then indicating actual SPS activation and release to the user equipment via PDCCH. So to speak, a user equipment does not perform SPS transmission/reception in direct despite receiving designation of a subframe for performing the SPS transmission/reception via RRC signaling but performs the SPS transmission/reception if receiving PDCCH (i.e., PDCCH from which SPS C-RNTI is detected) indicating the SPS activation/release. Moreover, the user equipment may be able to start to perform the SPS transmission/reception in accordance with a subframe periodicity and offset assigned by the RRC signaling in a manner of allocating a frequency resource to be used for the SPS transmission/reception in accordance with resource block allocation information designated via PDCCH indicating the SPS activation and applying a modulation scheme and a coding rate thereto by a modulation and coding scheme (MCS) designated via the PDCCH. Moreover, the user equipment may stop the SPS transmission/reception if receiving PDCCH indicating the SPS release. If the user equipment receives PDCCH indicating the activation (or reactivation) of the stopped SPS transmission/reception, the user equipment may be able to resume the SPS transmission/reception with the subframe periodicity and offset assigned by the RRC signaling in accordance with RB allocation, MCS and the like designated by the corresponding PDCCH.

In the current 3GP LTE system, as PDCCH DCI formats, various kinds of formats including UL DCI format 0, DL DCI format 1, DL DCI format 1A, DL DCI format 1B, DL DCI format 1C, DL DCI format 1D, DL DCI format 2, DL DCI format 2A, DL DCI format 3, DL DCI format 3A and the like are defined. This PDCCH DCI format may include an optional combination of such control information appropriate for each usage as a hopping flag, RB allocation, modulation & coding scheme (MCS), Redundancy Version (RV), New Data Indicator (NDI), Transmit Power Control (TPC), cyclic shift for DMRS (Demodulation Reference Signal), UL index for TDD, DL assignment index (DAI) for TDD, Channel Quality Information (CQI) request, DL HARQ process number, Transmitted Precoding Matrix Indicator (TPMI), PMI confirmation and the like.

For example, when CRC of DCI carried on PDCCH is masked with SPS C-RNTI, if NDI is set to 0 (NDI=0), Validity of PDCCH for SPS scheduling may be confirmed [validation]. In particular, in case of SPS activation, if a combination of a specific bit field is set to 0, it may be able to check whether it is a valid SPS activation control information. Table 3 shows specific fields usable in checking the SPS activation PDCCH validity.

TABLE 3

|  | DCI format 0 | DCI format 1/1A | DCI format 2/2A/2B |
| --- | --- | --- | --- |
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Thus, the method for checking a presence or non-presence of error in a manner of checking whether a combination of a specific bit field has a prescribed value may be represented as using the combination of the specific bit field as a virtual CRC. So to speak, using a virtual CRC, even if an error uncheckable with CRC occurs, an additional error detection is enabled by checking whether a corresponding bit field value is a previously determined prescribed value.

Thus virtual CRC type error detection is especially important for the SPS activation/release. For instance, since an error occurs in a PDCCH detection of a prescribed user equipment, if a PDCCH is incorrectly recognized as indicating an SPS activation for the prescribed user equipment despite that DCI is assigned to another user equipment, the corresponding user equipment keeps using an SPS transmission resource, whereby the one-time error causes a problem continuously. Therefore, it may be able to prevent a wrong SPS detection using a virtual CRC.

Meanwhile, in order to check a recovery of a resource allocated to a user equipment in case of an SPS release, a user equipment may be set to perform ACK/NACK transmission to indicate whether the user equipment has received PDCCH. In case of the SPS release, a value of a specific bit field is set in accordance with DCI format, as shown in Table 4, to be used as a virtual CRC.

TABLE 4

|  | DCI format 0 | DCI format 1A |
| --- | --- | --- |
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

Downlink Assignment Index in TDD System

PDCCH DCI format 0, PDCCH DCI format 1, PDCCH DCI format 1A, PDCCH DCI format 1B, PDCCH DCI format 1D, PDCCH DCI format 2, PDCCH DCI format 2A or the like may include a downlink assignment index (DAI). DAI field includes information on an index given to a subframe, in which PDSCH is transmitted, in a system of TDD type. And, it may be able to derive information on the number of PDSCHs, which are to be transmitted via ACK/NACK resource of a single UL subframe, in transmitting UL ACK/NACK for PDSCH using the corresponding index information. In the following description, the DAI field shall be explained in detail.

First of all, according to FDD, transmission and reception are performed in a manner of discriminating downlink (DL) and uplink (UL) per independent frequency band. In case that a base station sends PDSCH on DL band, a user equipment may be able to transmit an ACK/NACK response, which indicates a presence or non-presence of a complete DL data reception, via PUCCH on UL band corresponding to the DL band after specific duration. Hence, the DL and the UL operate in a one-to-one correspondence.

In particular, in a legacy 3GPP LTE system, for example, control information on a DL data transmission of a base station is delivered to a user equipment via PDCCH. The user equipment receives the data, which is scheduled via the PDCCH to the corresponding user equipment, via PDSCH and may be then able to transmit ACK/NACK via PUCCH, which is a channel for transporting UL control information, (or by piggyback on PUSHC). For clarity of description, if one PDCCH is not confused with another PDCCH for a different usage, it means the PDCCH for scheduling PDSCH. In particular, if there is no explanation for another meaning, PDCCH for scheduling PDSCH can be simply represented as PDCCH. Generally, PUCCH for ACK/NACK transmission is not assigned to each user equipment in advance. Instead, the corresponding PUCCH is configured in a manner that a plurality of PUCCHs are divided in each time to be used by a plurality of user equipments in a cell. Hence, as PUCCH for carrying ACK/NACK transmitted by a user equipment having received DL data in random time, it may be able to use PUCCH corresponding to PDCCH via which scheduling information on the corresponding DL data is received by the user equipment.

PUCCH corresponding to PDCCH shall be described in detail as follows. First of all, a region for carrying PDCCH in each DL subframe is constructed with a plurality of control channel elements (CCEs). And, PDCCH transmitted to a single user equipment in random subframe is constructed with at least one of the CCEs configuring the PDCCH region of the corresponding subframe. Moreover, resources for carrying a plurality of PUCCHs exist in a region for transmitting PUCCH of each UL subframe. In this case, the user equipment may be able to transmit ACK/NACK via PUCCH corresponding to an index matching an index of a specific CCE (i.e., a $1^{st}$ CCE) among a plurality of CCEs configuring the PDCCH received by the user equipment.

Figure 9:
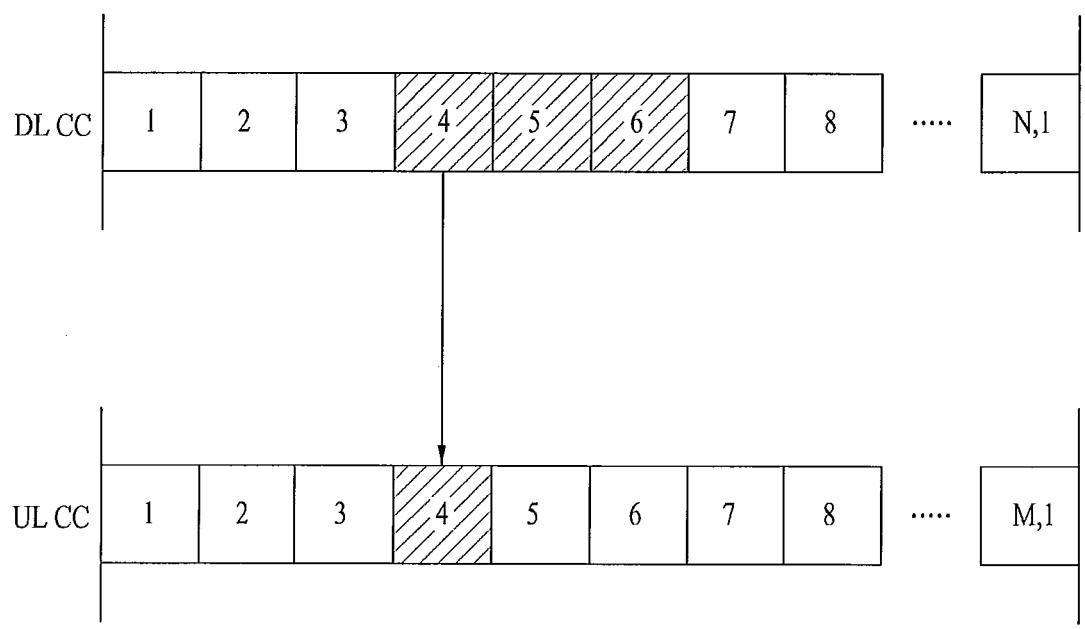
FIG. 9 is a diagram to describe ACK/NACK transmission resource.

FIG. 9 is a diagram to describe ACK/NACK transmission resource. In FIG. 9, each square of DL CC indicates CCE and each square of UL CC indicates PUCCH. Referring to FIG. 9, for example, assume a case that a single user equipment obtains PDSCH related information from PDCCH configured with CCEs #5 to #6 and then receives PDSCH. In this case, ACK/NACK information on the PDSCH may be transmitted on PUCCH corresponding to CCE #4, which is the $1^{st}$ CCE configuring the PDCCH for scheduling the PDSCH, i.e., on PUCCH #4.

Meanwhile, in a system according to TDD, unlike the FDD system, the same frequency band is used in a manner of being divided into DL subframes and UL subframes. Hence, in case of a data traffic situation asymmetric to DL/UL, DL subframes may be assigned more than UL subframes, and vice versa. In this case, unlike the case of the FDD system, DL subframes and UL subframes may not exist in a one-to-one correspondence. Especially, if the number of the DL subframes is greater than that of the UL subframes, it may happen that ACK/NACK responses for a plurality of PDSCHs transmitted in a plurality of DL subframes should be handled in a single UL subframe.

Thus, when a plurality of PDSCHs are transmitted to a single user equipment in a plurality of DL subframes, a base station transmits a plurality of PDCCHs for each of the PDSCHs one by one. In dong so, the user equipment may be able to transmit ACK/NACK on one PUCCH in one UL subframe for a plurality of the received PDSCHs. A method of transmitting one ACK/NACK for a plurality of PDSCHs may be mainly classified into an ACK/NACK bundling transmission and a PUCCH selection transmission.

According to the ACK/NACK bundling transmission, a user equipment transmits one ACK on one PUCCH if succeeding in fully decoding a plurality of the received PDSCHs. Otherwise, i.e., if the user equipment fails in decoding any one of the received PDSCHs, the user equipment transmits NACK.

According to the PUCCH selection transmission (or channel selection transmission), when a user equipment receives a plurality of PDSCHs, the user equipment occupies a plurality of PUCCHs available for its ACK/NACK transmission in a random manner. The user equipment may be then able to transmit a plurality of ACK/NACK's using a combination of 'transmitting ACK/NACK by selecting a prescribed PUCCH from a plurality of the occupied PUCCHs (i.e., selecting a prescribed channel is used as an information bit)' and 'a modulated/coded content of the selected PUCCH for transmission. For instance, after one of 2 PUCCHs has been selected, if a-bit ACK/NACK information is transmitted on the selected PUCCH, it may be able to represent 1-bit information by selecting one of the two PUCCHs. Therefore, it may be able to transmit (a+1)-bit ACK/NACK information.

When a user equipment transmits ACK/NACK signal to a base station by one of the above-described methods, it may be able to assume a case that the user equipment may not receive PDCCH transmitted by the base station in part (i.e., the user equipment misses the transmitted PDCCH in part). In this case, since the user equipment is unable to recognize the fact that PDSCH corresponding to the missed PDCCH has been transmitted to the user equipment at all, it may cause error to ACK/NACK creation.

In order to solve this error, a TDD type system defines to indicate the number of PDSCHs to be transmitted on ACK/NACK resource in a single UL subframe in a manner that DAI (downlink assignment index) is included in PDCCH. For instance, if a single UL subframe is set to correspond to N DL subframes, an index is sequentially given to PDSCH transmitted in an interval of the N DL subframes (i.e., PDSCHs are sequentially counted) and is then carried on the PDCCH for scheduling the PDSCH. Hence, a user equipment refers to the DAI information contained in the PDCCH and may be then able to recognize whether the previous PDCCH has been correctly received.

Figure 10:
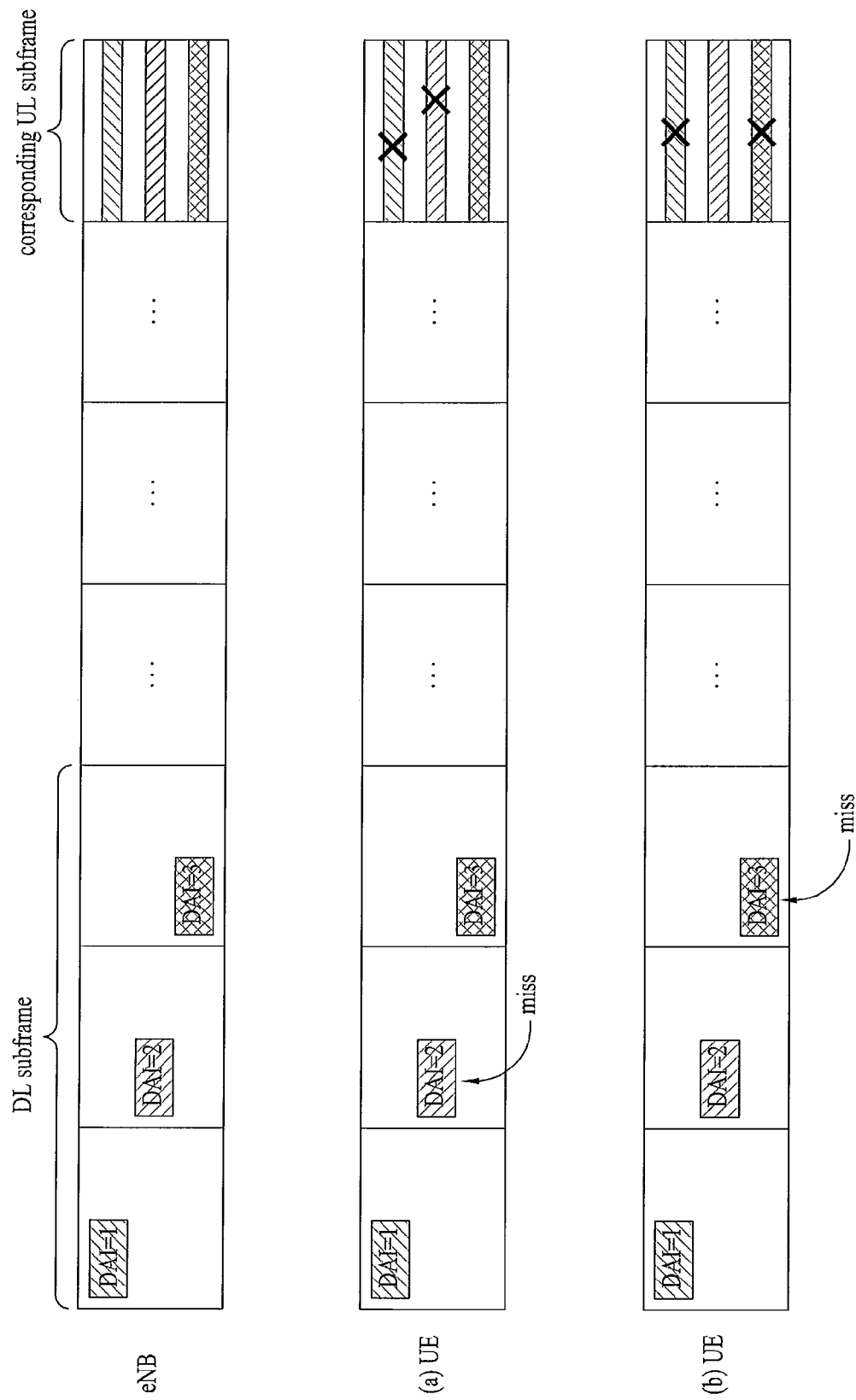
FIG. 10 is a diagram to illustrate ACK/NACK transmission if a user equipment fails in receiving one of a plurality of PDCCHs in TDD system.

ACK/NACK signal, which is transmitted if a user equipment fails in receiving one of a plurality of PDCCHs in TDD system, is described with reference to FIG. 10 as follows. FIG. 10 shows a case that one UL subframe corresponds to 3 DL subframes.

FIG. 10 (a) shows a case that a user equipment UE has missed a $2^{nd}$ PDCCH. In particular, the user equipment receives PDCCH having 'DAI=1' and then receives PDCCH having 'DAI=3'. In this case, since DAI (=3) of a $3^{rd}$ PDCCH, which is a last PDCCH, is different from the number (i.e., 2) of PDCCHs received so far, the user equipment recognizes that the $2^{nd}$ PDCCH is missing and may be then able to send a corresponding ACK/NACK.

FIG. 10 (b) shows a case that a user equipment UE has missed a last ($3^{rd}$) PDCCH. In particular, the user equipment receives PDCCH having 'DAI=1' and PDCCH having 'DAI=3' in order and then fails in receiving PDCCH having 'DAI=3'. In this case, since DAI index of the last received PDCCH matches the number of PDCCHs received so far, the user equipment is unable to recognize that the last PDCCH is missing. Hence, the user equipment may recognize that 2 PDCCHs are scheduled only in the DL subframe interval. In this case, since ACK/NACK information is transmitted not on PUCCH resource corresponding to 'DAI=3' but on PUCCH resource corresponding to 'DAI=2', a base station may be able to recognize that the user equipment has missed the PDCCH containing 'DAI=3'.

Downlink Assignment Index in Multicarrier Supportive System

In the following description, various methods for a user equipment to transmit ACK/NACK signal for a plurality of PDSCHs scheduled in a multicarrier system are explained.

First of all, when a plurality of PDCCHs for scheduling a plurality of PDSCH transmissions are transmitted in a multicarrier system, if a user equipments fails in receiving at least one of a plurality of the transmitted PDCCHS (i.e., the user equipment misses at least one of a plurality of the transmitted PDCCHs), ACK/NACK creation error may occur. In order to fix this error, it may be able to consider informing a user equipment of the total number of PDCCHS for scheduling PDSCHs or order information of PDCCH. In order to inform the user equipment of such information, it may be able to use DAI field defined in PDCCH DCI format. Although the conventional DAI information is defined by TDD type system, the present invention enables DAI information on PDSCH scheduling to be configured in both of the FDD type multicarrier system and the TDD type multicarrier system. In the following description, PDCCH for scheduling PDSCH shall be simply represented as PDCCH unless special explanation for another meaning is mentioned.

$1^{st}$ Method $1^{st}$ method, i.e., how information indicating the total number of PDCCHs transmitted to a corresponding user equipment (i.e., the total number of PDSCHs transmitted to the corresponding user equipment) is included in each PDCCH, is described with reference to FIG. 11 as follows.

As mentioned in the foregoing description, PDCCH means PDCCH for scheduling PDSCH and one PDCCH schedules one PDSCH transmission. Hence, the number of PDCCHs is equal to the total number of PDSCHs scheduled for a corresponding user equipment. Referring to FIG. 11 (a), when a base station eNB transmits PDCCHs and PDSCHs, 3 PDCCHS may be able to schedule total 3 PDSCH transmissions. Moreover, when a base station transmits at least one or more PDCCHs to a random user equipment in one subframe (i.e., a case of cross-carrier scheduling is included), it may able to notify information indicating the number of PDCCHS the corresponding user equipment should receive in the corresponding subframe via each of the at least one or more PDCCHS. In particular, the user equipment may be informed of the number of the PDCCHs via DAI field in PDCCH DCI format. FIG. 11 (b) shows a case that a user equipment fails in detecting one of a plurality of PDCCHs. FIG. 11 (c) and FIG. 11 (d) show various methods of configuring a plurality of ACK/NACK resources. FIG. 11 (c) and FIG. 11 (d) show one example of configuring a plurality of PUCCHs UE-specifically and then transmitting ACK/NACK information on one PDSCH via one of the PUCCH resources, one example of transmitting ACK/NACK information on a plurality of PDSCHs on one PUCCH via extended PUCCH, and one example of transmitting ACK/NACK information on a plurality of PDSCHs in a manner that the ACK/NACK information is piggybacked on PUSCH.

For instance, when a base station transmits 3 PDCCHs in one subframe to a user equipment, information indicating that the 3 PDCCHs are transmitted may be transmitted on each of the 3 PDCCHs transmitted to the corresponding user equipment. FIG. 11 (a) and FIG. 11 (b) show that DAI field included in each PDCCH has a value (e.g., the number of PDCCHs, the number of PDSCHs, etc.) 3. According to this method, if a user equipment misses any one of a plurality of the PDCCHs transmitted to the user equipment, it may be able to recognize the missing PDCCH via the PDCCH number information carried on other PDCCHs received by the user equipment.

Figure 11:
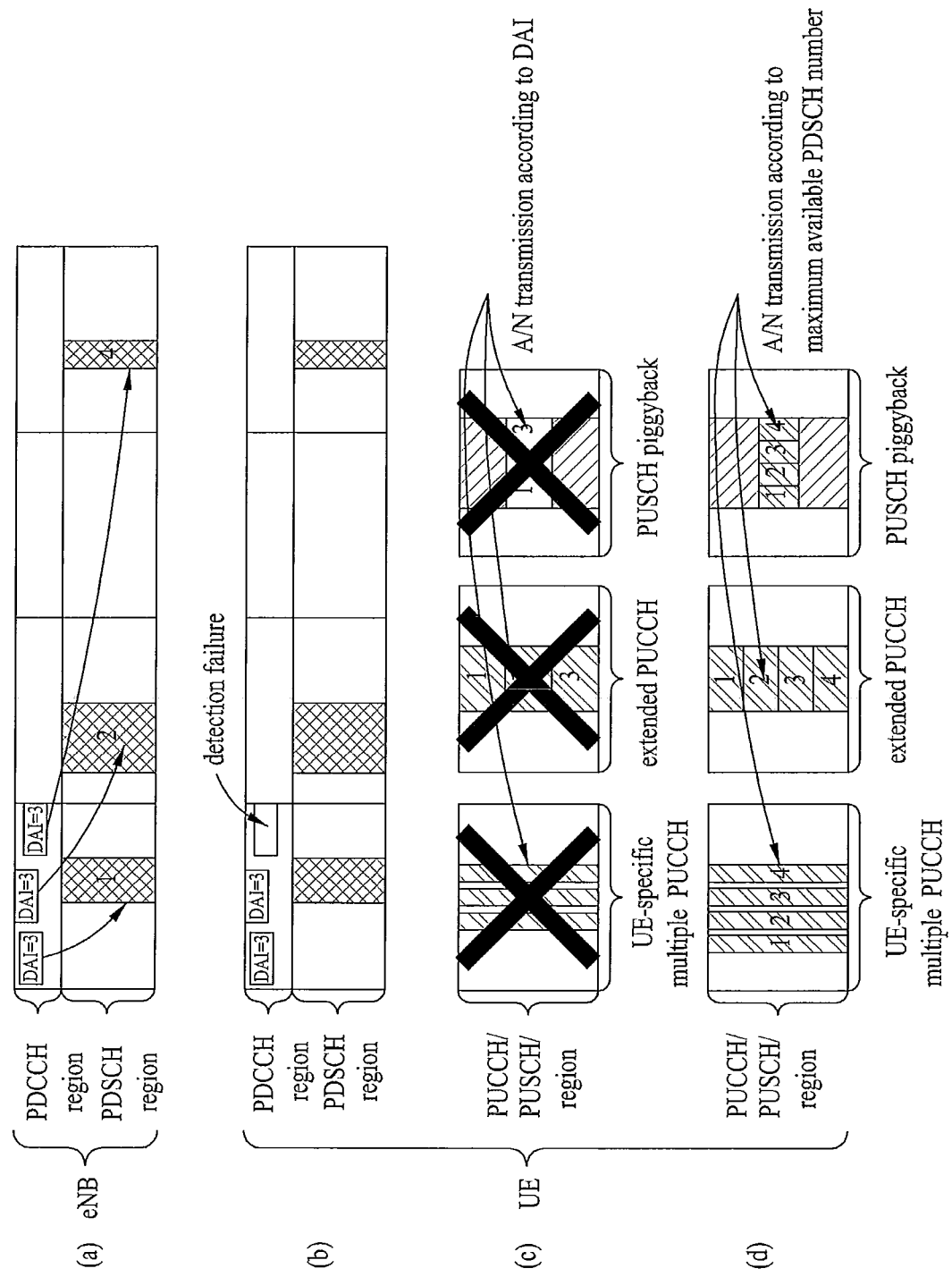
FIG. 11 is a diagram to describe a method of indicating the total number of PDCCHs.

According to the present method, if a user equipment detects 2 PDCCHs from 3 PDCCHs only [FIG. 11 (b)], the user equipment may be aware that it receives 2 PDCCHs only despite that a base station has transmitted 3 PDCCHs through the PDCCH number information. Yet, it may happen that it is unable to know which PDCCH (i.e., PDCCH having a prescribed order) is missed by a user equipment. For instance, when ACK/NACK is transmitted on each PUCCH corresponding to CCE index of each PDCCH, since there is no ACK/NACK transmission on PUCCH corresponding to the CCE index of the missing PDCCH, a base station is able to recognize which PDCCH is missed by a user equipment. Yet, if a PUCCH resource for ACK/NACK transmission is independently allocated to a user equipment in advance irrespective of a prescribed PDCCH and the previously allocated PUCCH resources are then arranged in order of received PDCCH, the user equipment is unable to know the order of the missing PDCCH. Hence, in case of PDCCH reception error, it may be unable to correctly perform PUCCH resource allocation. Likewise, when ACK/NACK is transmitted on PUSCH resource by piggyback, it may be unable to know the order of the missing PDCCH, it may be unable to configure ACK/NACK resource mapping.

In particular, referring to FIG. 11 (b), when a user equipment detects 2 PDCCHs from 3 PDCCHs only but fails in detecting 1 PDCCH, the user equipment is able to recognize that total 3 PDCCHs have been transmitted (i.e., total 3 PDSCHs are scheduled) but is unable to know which PDCCH is not detected. In this case, referring to FIG. 11 (c), in case that 3 ACK/NACK transmission resources are allocated previously, it may be unclear to determine which ACK/NACK transmission resource corresponds to which PDSCH transmission. In particular, the user equipment is unable to determine that the ACK/NACK information on PDSCHs scheduled by the received 2 PDCCHs will be mapped to which two of the 3 ACK/NACK transmission resources. Likewise, the base station is unable to determine that the ACK/NACK information mapped to each of 2 prescribed ACK/NACK transmission resources among the 3 ACK/NACK transmission resources relates to which PDSCH transmission.

Therefore, it may be able to solve the above problem in a manner of securing ACK/NACK resources corresponding to the number of PDSCHs, which can be scheduled to a user equipment at a specific timing point to the maximum, in order to prepare for the above-mentioned PDCCH detection failure and then defining the ACK/NACK resource mapping to be performed in order PDSCH located CC. For instance, referring to FIG. 11 (d), having received 2 PDCCHS among 3 PDCCHs, a user equipment knows that total 3 scheduled PDSCHs exist and that the maximum number of the schedulable PDSCHs is 4. And, the user equipment may be aware that PDSCH transmission on $1^{st}$ and $2^{nd}$ CCs is scheduled by the 2 received PDCCS (despite not knowing that one missing PDCCH is which PDCCH having a prescribed order value). For instance, the user equipment enables ACK/NACK information on the corresponding PDSCH to be mapped a $1^{st}$ ACK/NACK transmission resource for the PDSCH on the $1^{st}$ CC and also enables ACK/NACK information on the corresponding PDSCH to be mapped a $2^{nd}$ ACK/NACK transmission resource for the PDSCH on the $2^{nd}$ CC. Likewise, the base station may be able to check that the ACK/NACK information transmitted by the user equipment relates to the PDSCH transmitted on which CC.

Figure 12:
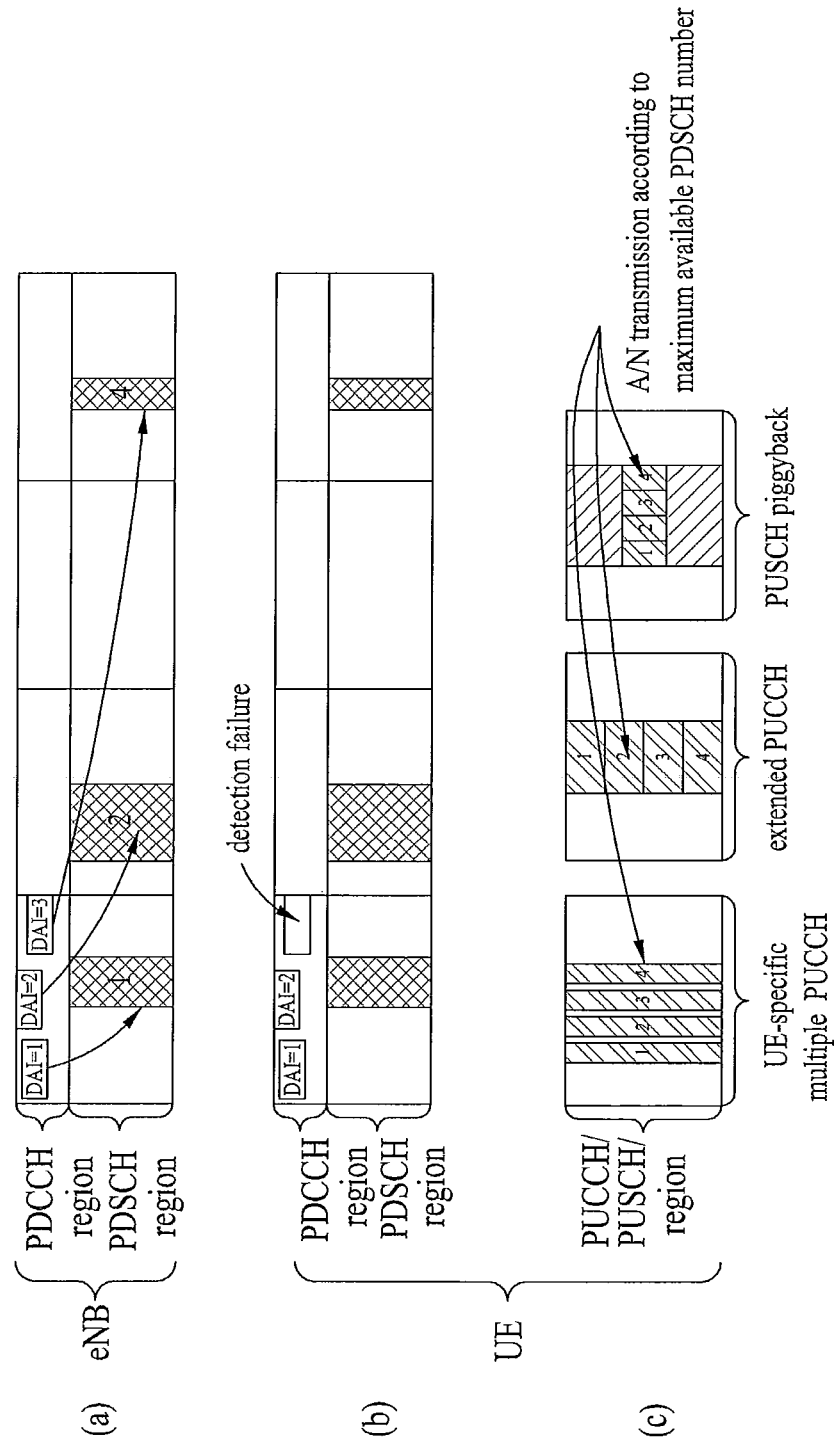
FIG. 12 is a diagram to describe a method of indicating the PDCCH index value.

$2^{nd}$ Method $2^{nd}$ method, i.e., how information indicating an order value of PDCCH transmitted to a corresponding user equipment (i.e., an order value of PDSCH transmitted to the corresponding user equipment) is included in each PDCCH, is described with reference to FIG. 12 as follows.

First of all, when a base station transmits one PDCCH or a plurality of PDCCHs in one subframe to a random user equipment, the base station may inform the corresponding user equipment of an order value of the PDCCH transmitted in the corresponding subframe using each of the PDCCHs. For instance, referring to FIG. 12 (a), when a base station transmits 3 PDCCHs in one subframe to a user equipment, the able station enables values 1, 2 and 3 (or values 0, 1 and 2) to be included in the PDCCHs as order values of the corresponding PDCCHs, respectively. Each of the order values may be transmitted via DAI field of each PDCCH DCI format. In doing so, the PDCCH order may be determined in accordance with a size of CCE index configuring PDCCH, the frequency order of CC carrying PDSCH, or the order of CIF (carrier indication field) value of CC, for example.

For instance, if a user equipment receives PDCCH having an order value 1 and PDCCH having an order value 3 in one subframe, it may be able to recognize that PDCCH having an order value 2 and PDSCH corresponding to the PDCCH having the order value 2 are missing. In particular, unlike the $1^{st}$ method, the user equipment may be able to know the order of the received PDCCH and may be then able to know an index of the PDCCH missed in the middle. Yet, referring to FIG. 12 (b), if a last ODCCH is missing, since the order values 1 and 2 of the previously PDCCHs match the sequence of the received PDCCHs, the user equipment is unable to recognize that the last PDCCH is missing. Therefore, the user equipment is unable to know how many PDCCHs were entirely transmitted to the corresponding user equipment by a base station.

Moreover, it may be able to consider a case that bundled ACK/NACK for all PDSCHs is transmitted on PUCCH corresponding to CCE index of PDCCH last received by a user equipment. In this case, when a base station assigns 3 PDCCHS to a user equipment, if the user equipment misses the last PDCCH, the user equipment recognizes that two PDSCHs scheduled by the received PDSCHs are normally received and then transmits ACK/NACK information via PUCCH resource corresponding to the $2^{nd}$ PDCCH. Accordingly, since the base station knows that the ACK/NACK was transmitted on the PUCCH corresponding not to the last PDCCH but to the $2^{nd}$ PDCCH and may be then able to recognize that the user equipment missed the last PDCCH. Meanwhile, when the bundled ACK/NACK is transmitted not on the PUCCH corresponding to the CCE carrying the PDCCH but on a UE-specifically allocated PUCCH resource, if the user equipment transmits the bundled ACK/NACK for the $1^{st}$ two PDCCHs on the assigned PUCCH, as shown in the above example, it may happen that the base station is unable to know whether the corresponding ACK/NACK is the bundle of two PDSCHs or the bundle of 3 PDSCHs.

Moreover, if the total number of the transmitted PDSCHs (or the number of PDSCHs for scheduling PDSCHs) is not provided to a user equipment, it may be necessary to secure ACK/NACK resources matching the maximum number of schedulable PDSCHs. Referring to FIG. 12 (c), for instance, if maximum 4 PDSCHs are schedulable, transmission should be performed by securing ACK/NACK resources on the assumption that 4 PDSCHs are always transmitted. In this case, when multiple ACK/NACK's are piggybacked on PUSCH or transmitted via PUCCH format capable of carrying multiple ACK/NACK's, since unnecessary resources should be secured in advance, ACK/NACK information bits are increased. Therefore, it may be unable to lower a code rate efficiently.

Based on the above-described matters, various embodiments of the present invention for configuring DAI field of PDCCH DCI format to configure and transmit ACK/NACK information on PDSCH scheduled in a multicarrier supportive system are explained. In the following description, PDCCH for scheduling PDSCH shall be schematically represented as PDCCH unless special explanation for another meaning is mentioned.

According to the DAI transmitting scheme of the $1^{st}$ or $2^{nd}$ method, since ACK/NACK information on the maximum number of PDSCHs schedulable at a corresponding timing point is transmitted instead of ACK/NACK information on actually scheduled PDSCHs, it may cause a problem that a size of the ACK/NACK information is unnecessarily increased.

Therefore, the present invention proposes a method of reducing signaling overhead by transmitting ACK/NACK for actually scheduled PDSCH only and by being robust against an error situation of failure in PDCCH detection. In particular, information on the total number of PDCCHS for assigning DL data channel transmitted to a single user equipment during a specific time interval (or, the total number of scheduled PDSCHs) and information on an order value of the corresponding PDCCH (or, an order value of PDSCH) are transmitted on each PDCCH to the user equipment. Subsequently, the corresponding user equipment receives the transmitted informations and then generates ACK/NACK information on the received PDSCH.

In doing so, even if PDCCH (e.g., PDCCH carrying SPS-release), which needs reception confirmation for the detection of PDCCH exists, the total number of all PDCCHs (i.e., all PDCCHs triggering ACK/NACK transmission in uplink) and an order value of the PDCCH may be represented in the corresponding PDCCH using DAI.

In this case, the specific time interval means a DL subframe interval corresponding to a UL subframe in which ACK/NACK will be transmitted. For instance, in an FDD type system having DL subframe and UL subframe exist in a one-to-one correspondence, a specific time interval amounts to 1 DL subframe. Meanwhile, in a TDD type system, a specific time interval may amount to at least one DL subframe in accordance with DL-UL configuration or the like.

Preferably, assuming that PDCCHs, of which number is equal to a total number of PDCCHs indicated by DAI in each PDCCH, will be transmitted, a user equipment may be able to transmit ACK/NACK information on PDSCH scheduled by the corresponding PDCCH. In doing so, ACK for normal PDSCH reception, NACK for PDSCH reception error and DTX response for reception failure of PDCCH may be included in the ACK/NACK information. In this case, the DTX response may indicate that ACK or NACK information is not transmitted. For reduction of information, the DTX response may be represented as the same state of NACK.

In the following description, a case of transmitting DAI including the total number of PDCCHs and the PDCCH order value is explained with reference to FIG. 13.

Figure 13:
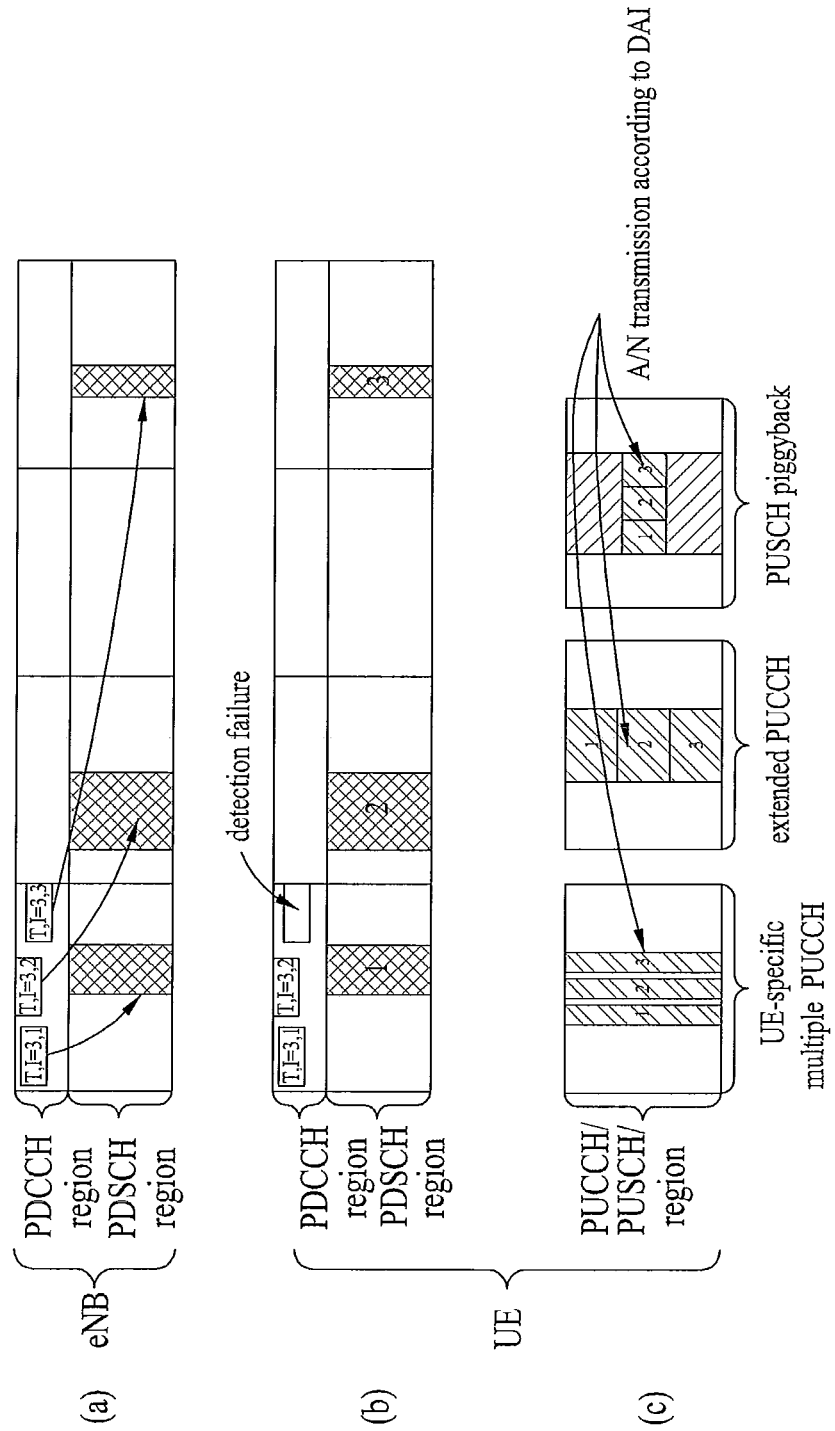
FIG. 13 is a diagram to describe a case of transmitting DAI including the total number of PDCCHs and the PDCCH index value.

Referring to FIG. 13 (a), when scheduling of maximum 4 PDSCHs is available, a base station transmits total 3 PDCCHs to schedule total 3 PDSCHs. In doing so, information on a total number T and an order value (index) I may be included in each of the 3 PDCCHS. In particular, '(T,I)=(3,1)' may be set for the $1^{st}$ PDCCH, '(T,I)=(3,2)' may be set for the $2^{nd}$ PDCCH, and '(T,I)=(3,3)' ma be set for the $3^{rd}$ PDCCH.

Referring to FIG. 13 (b), for example, a user equipment fails in detecting one of 3 PDCCHs (i.e., a last PDCCH). Since the user equipment is aware of a total sym value (T=3), it may be able to recognize that 1 PDCCH is missing. Since the user equipment does not receive an index 3, the user equipment may be able to recognize that the missing PDCCH is the last PDCCH. Thus, since the user equipment knows the total sum value of PDCCH and also knows what is an index of the reception-failure PDCCH, it may be able to correctly transmit ACK/NACK information in accordance with the total sum value and a data transmission mode on CC that carries PDSCH.

The ACK/NACK information in accordance with the transmission mode of PDSCH may include one ACK/NACK or DTX response in case of a single transport block transmission mode for one CC for example. Alternatively, the ACK/NACK information may include 2 ACK/NACK's or DTX responses in case of maximum 2 transmission block transmission mode. In this case, in order to reduce ACK/NACK transmission information, the DTX response may be mapped to the same state of NACK.

As mentioned in the foregoing description, when information on the total number and order value of PDCCH is represented using DAI field in PDCCH, a user equipment may be able to correctly generate and transmit ACK/NACK information on at least one PDSCH scheduled through at least one PDCCH in a multicarrier supportive system.

The aforementioned PDCCH total number, the aforementioned PDCCH order value and a combination thereof may be represented in a manner of being mapped to a specific DAI value. In order to reduce a DAI information size, it may be able to consider mapping the PDCCH total number, the PDCCH order value and the combination thereof to a specific DAI value duplicatively. As rules of mapping the total number and order value of PDCCH to a specific value duplicatively, 3 kinds of rules in the following may apply.

1. In order to reduce a DAI information size, specific PDCCH total sum values are mapped to the same DAI value. In particular, total sum values, which are spaced apart from each other as far as possible (i.e., in big difference in-between), may be mapped to the same DAI value.

2. In order to reduce a DAI information size, specific PDCCH order values are mapped to the same DAI value. In particular, order values, which are spaced apart from each other as far as possible (i.e., in big difference in-between), may be mapped to the same DAI value.

3. In order to reduce a DAI information size, a specific combination of different total sum values and different order values are mapped to the same DAI value.

Based on the above-mentioned matters, various embodiments of the present invention for configuring a DAI field by setting a DAI value mapped to a PDCCH total sum value and a PDCCH order value are described in detail as follows.

1st Embodiment

The 1st embodiment relates to a method of configuring a PDCCH total sum value and a PDCCH order value separately and then transmitting the PDCCH total sum value and the PDCCH order value.

For instance, when 5 CCs exist in a system, if a total sum value ($n_{total}$) and an order value ($n_{index}$) are independently transmitted, each of the $n_{total}$ and the $n_{index}$ total needs information including 3 (=ceiling(log₂5)) bits and total 6 bits are required for a DAI field to represent them all. So to speak, the PDCCH total sum value and the PDCCH order value may be separately coded.

2nd Embodiment

The 2nd embodiment relates to a method of configuring and transmitting a total combination of total sum value ($n_{total}$) and order value ($n_{index}$).

It may be able to assume a case that maximum $N_{max}$ PDCCHs exist simultaneously. In this case, the $N_{max}$ is a maximum value of the number of CCs existing in a system and may correspond to a value configured in common to all user equipments in a cell, the maximum number of receivable CCs configured semi-static to a user equipment by a base station, or a value of active CC configured to be dynamically received by a user equipment. In the following embodiments, the $N_{max}$ may have the same meaning.

In case that maximum $N_{max}$ PDCCHs exist simultaneously, a total sum value corresponds to '$1 \leq n_{total} \leq N_{max}$' and an order value is set to have a range of '$1 \leq n_{index} \leq n_{total}$' in accordance with the total sum value. Hence, the number of bits required for representing a combination of the PDCCH total sum value and the PDCCH order value becomes ceiling(log₂$N_{max}$ ($N_{max}$+1)/2). So to speak, the PDCCH total sum value and the PDCCH order value can be joint-coded. For instance, in case that maximum 5 PDCCHs exist simultaneously, information including total 4 (=ceiling(log₂5(5+1)/2)) bits is required. Hence, compared to the 1st embodiment, the 2nd embodiment may be able to considerably reduce the number of the required bits. The above description relates to a case that a start value of the order value is set to 1. If the start value of the order value is set to 0, a range of the order value may be represented as '$0 \leq n_{index} \leq n_{total}-1$'

FIG. 14 is a diagram for one example of a DAI field for representing a combination of PDCCH total sum value ($n_{total}$) and PDCCH order value ($n_{index}$) [i.e., configuring PDCCH total sum value and PDCCH order value by joint coding] according to a 2nd embodiment of the present invention. Referring to FIG. 14, DAI value is basically assigned in ascending order of a total sum value and a DAI field value may be configured in a manner of assigning a DAI value in ascending order of an order value settable in accordance with each total sum value. In FIG. 14, when maximum 5 PDCCHs exist simultaneously, 15 kinds of combinations of a total sum value and an order value may be configured. In order to represent these combinations, 4 bits are required for the DAI field. For instance, if a total sum value and an order value are set to 3 and 2, respectively, it may be able to assign a DAI field value '4'. FIG. 14 (a) shows a case that a start value of an order value is set to 1. In this case, DAI value may be represented as Formula 1. FIG. 14 (b) shows a case that a start value of an order value is set to 0. In this case, DAI value may be represented as Formula 2.

$$DAI = n_{total}(n_{total}-1)/2 + n_{index} - 1 \quad \text{[Formula 1]}$$

$$DAI = n_{total}(n_{total}-1)/2 + n_{index} \quad \text{[Formula 2]}$$

FIG. 15 is a diagram for another example of DAI field indicating a combination of a total sum value ($n_{total}$) and an order value ($n_{index}$) according to a 2nd embodiment of the present invention. The example represented as the conventional RIV in FIG. 15 is to re-describe a conventional formula (i.e., Formula 3) for determining the RIV (resource indication value) described with reference to Table 1. Using this conventional RIV expression, it may be able to determine a DAI value.

if $L-1 \leq \lfloor N_{RB}/2 \rfloor$ then $RIV = N_{RB}(L-1) + S$ else $$RIV = N_{RB}(N_{RB}-L+1) + (N_{RB}-1-S) \text{ End} \quad \text{[Formula 3]}$$

Referring to FIG. 15 (a), an index of the number L of resources in RIV expression is substituted with an inverse index ($N_{max}+1-n_{total}$) of a total sum value ($n_{total}$) and a start value S of a resource in the RIV expression is substituted with an order value ($n_{index}-1$) in which the start value of the order value is set to 1. In this case, a DAI value may be represented as Formula 4.

if $N_{max} - n_{total} \leq \lfloor N_{max}/2 \rfloor$ then $DAI = N_{max}(N_{max}-n_{total}) + n_{index} - 1$ else $$DAI = N_{max}(n_{total}) + (N_{max}-n_{index}) \text{ End} \quad \text{[Formula 4]}$$

Referring to FIG. 15 (b), an index of the number L of resources in RIV expression is substituted with an inverse index ($N_{max}+1-n_{total}$) of a total sum value ($n_{total}$) and a start value S of a resource in the RIV expression is substituted with an order value ($n_{index}-1$), in which the start value of the order value is set to 0. In this case, a DAI value may be represented as Formula 5.

if $N_{max} - n_{total} \leq \lfloor N_{max}/2 \rfloor$ then $DAI = N_{max}(N_{max}-n_{total}) + n_{index}$ else $$DAI = N_{max}(n_{total}) + (N_{max}-1-n_{index}) \text{ End} \quad \text{[Formula 5]}$$

3rd Embodiment

The 3rd embodiment relates to a method of, if a PDCCH total sum value ($n_{total}$) is equal to the maximum schedulable PDCCH number ($N_{max}$), transmitting the PDCCH total sum value ($n_{total}$) only without transmitting a PDCCH order value ($n_{index}$).

If a user equipment receives PDCCH, it may be able to know a CC on which PDSCH scheduled by the PDCCH will be carried. In this case, if $N_{max} = n_{total}$ PDSCH exists in every CC allocable to the user equipment. And, if an order value of the PDCCH is mapped in CC frequency order or CIF order, the order value of the PDSCH carrying CC and the order value of the PDCCH are matched together in a one-to-one correspondence. Hence, in this case, if the user equipment is not informed of the order value of the PDCCH separately, the user equipment is implicitly aware of the order value of the PDCCH by recognizing the CC on which the PDSCH will be carried. So, if a prescribed PDCCH is missing, the user equipment may be able to know the PDCCH missed by the user equipment in a manner of recognizing the CC on which the PDSCH is not carried. Therefore, if $n_{total}=N_{max}$, although the same DAI value is duplicatively mapped irrespective of the $n_{index}$, unclearness may not occur irrespective. Hence, it may be able to decrease the number of bits for indicating a combination of PDCCH total sum value ($n_{total}$) and PDCCH order value ($n_{index}$).

FIG. 16 is a diagram for one example of DAI field indicating a combination of PDCCH total sum value ($n_{total}$) and PDCCH order value ($n_{index}$) [i.e., configured by joint coding PDCCH total sum value and PDCCH order value together] according to a 3$^{rd}$ embodiment of the present invention. Referring to FIG. 16, if a total sum value ($n_{total}$) is equal to the maximum schedulable PDCCH number ($N_{max}$) [i.e., $n_{total}$=5] order values 1 to 5 (or, order values 0 to 4) may be duplicatively assigned to the same DAI value '5'. Thus, if a DAI field value is not assigned to each order value ($n_{index}$) for the case of $n_{total}=N_{max}$ it may be able to decrease the number of states. Therefore, it may be able to further reduce signaling overhead. FIG. 16 (a) corresponds to a case that a start value of an order value is set to 0. In this case, a DAI value may be represented as Formula 6. FIG. 16 (b) corresponds to a case that a start value of an order value is set to 0. In this case, a DAI value may be represented as Formula 7.

if $n_{total}<N_{max}$ $DAI=n_{total}(n_{total}-1)/2+n_{index}-1$ elseif $n_{total}=N_{max}$ $DAI=n_{total}(n_{total}-1)/2$ [Formula 6]

if $n_{total}<N_{max}$ $DAI=n_{total}(n_{total}-1)/2+n_{index}$ elseif $n_{total}=N_{max}$ $DAI=n_{total}(n_{total}-1)/2$ [Formula 7]

4$^{th}$ Embodiment

The 4$^{th}$ embodiment relates to a method of, if PDCCH total sum value ($n_{total}$) is equal to or greater than a prescribed threshold, mapping a combination of PDCCH total sum value ($n_{total}$) and PDCCH order value ($n_{index}$) to the same DAI value duplicatively.

When a user equipment is not aware of a total sum value ($n_{total}$) or an order value ($n_{index}$) m if the user equipment receives PDCCH, it may cause a problem that the user equipment should transmit ACK/NACK information on $N_{max}$ PDSCHs all the time. Hence, it may be able to consider performing a transmission in a manner of setting a threshold ($N_{th}$) for the $N_{max}$ and mapping every case of '$n_{total} \geq N_{th}$' to the same DAI value. In particular, if $n_{total}<N_{th}$, it may be able to define that ACK/NACK information on $n_{total}$ PDSCHs is transmitted using the total sum value ($n_{total}$) and the order value ($n_{index}$). If $n_{total} \geq N_{th}$, it may be able to define that ACK/NACK information on $N_{max}$ PDSCHs is transmitted.

According to the 4$^{th}$ embodiment, if a total sum value ($n_{total}$) is equal to or greater than a threshold ($N_{th}$) instead of reducing a DAI information size, an ACK/NACK information size increases. Hence, the 4$^{th}$ embodiment using the threshold may be advantageous in an environment insensitive to performance degradation depending on variation of an ACK/NACK information size.

FIG. 17 is a diagram for one example of DAI field indicating a combination of a total sum value ($n_{total}$) and an order value ($n_{index}$) [i.e., configured by joint coding PDCCH total sum value and PDCCH order value together] according to a 4$^{th}$ embodiment of the present invention. Referring to FIG. 17, if a threshold ($N_{th}$) is 3 for example, every combination of a total sum value ($n_{total}$) and an order value ($n_{index}$) is mapped to the same DAI value '3'. FIG. 17 (a) corresponds to a case that a start value of an order value is set to 1. In this case, a DAI value may be represented as Formula 8. FIG. 17 (b) corresponds to a case that a start value of an order value is set to 0. In this case, a DAI value may be represented as Formula 9.

if $n_{total}<N_{th}$ $DAI=n_{total}(n_{total}-1)/2+n_{index}-1$ elseif $n_{total} \geq N_{th}$ $DAI=N_{th}(N_{th}-1)/2$ [Formula 8]

if $n_{total}<N_{th}$ $DAI=n_{total}(n_{total}-1)/2+n_{index}$ elseif $n_{total} \geq N_{th}$ $DAI=N_{th}(N_{th}-1)/2$ [Formula 9]

Meanwhile, the aforementioned example relates to the case of, if the total sum value ($n_{total}$) is equal to or greater than the threshold ($N_{th}$), the combinations of the total sum value ($n_{total}$) and the order value ($n_{index}$) are mapped to the same DAI duplicatively. Yet, if the total sum value ($n_{total}$) exceeds the threshold ($N_{th}$), the combinations of the total sum value ($n_{total}$) and the order value ($n_{index}$) may be mapped to the same DAI duplicatively according to the same principle. The threshold ($N_{th}$) may be set equal or different for each order value ($n_{index}$). The threshold ($N_{th}$) may be explicitly signaled to a user equipment. Alternatively, the threshold ($N_{th}$) may be an implicitly set value (e.g., a fixed value under a specific condition).

5$^{th}$ Embodiment

The 5$^{th}$ embodiment relates to a method of, if PDCCH total sum value ($n_{total}$) is equal to or greater than a prescribed threshold ($N_{th}$), transmitting the PDCCH total sum value ($n_{total}$) only without transmitting PDCCH order value ($n_{index}$). Compared to the 4$^{th}$ embodiment that relates to the method of assigning the same DAI value irrespective of the variation of the total sum value ($n_{total}$) if the total sum value ($n_{total}$) is equal to or greater than the threshold ($N_{th}$), the 5$^{th}$ embodiment relates to the following method. In particular, according to the 5$^{th}$ embodiment, if PDCCH total sum value ($n_{total}$) is equal to or greater than a threshold ($N_{th}$), the total sum value ($n_{total}$) is transmitted only (i.e., a different DAI value is assigned in accordance with a variation of the total sum value ($n_{total}$) or the same DAI value is assigned if an order value ($n_{index}$) varies with the same total sum value ($n_{total}$)).

Hence, after a threshold ($N_{th}$) has been set, if $n_{total} \geq N_{th}$, transmission may be performed in a manner that cases of every order value ($n_{index}$) of the same PDCCH total sum value ($n_{total}$) are mapped to one same DAI value. If $n_{total}<N_{th}$, transmission may be performed in a manner that a different DAI value is mapped to each combination of a total sum value ($n_{total}$) and an order value ($n_{index}$). In this case, if $n_{total}<N_{th}$, it may be able to define that a user equipment transmits ACK/NACK information on $n_{total}$ PDSCHs using the total sum value ($n_{total}$) and the order value ($n_{index}$). If $n_{total} \geq N_{th}$, it may be able to define that a user equipment transmits ACK/NACK information on $N_{max}$ PDSCHs.

Considering a case of applying an ACK/NACK bundling, according to the 5$^{th}$ embodiment, since a user equipment is able to recognize the number ($n_{total}$) of PDCCHs transmitted by a base station, it may be able to provide property robust against PDCCH reception failure. If a base station is configured to schedule total 5 PDSCHs and a user equipment is configured to transmit a bundle of ACK/NACK, unless a PDCCH total sum value is provided to the user equipment, when the user equipment receives 4 PDSCHs only, since the user equipment does not know that the base station has scheduled total 5 PDSCHs, it may be possible for the user equipment to incorrect ACK/NACK information by misunderstanding that total 4 PDSCHs are scheduled. Hence, if the PDCCH total sum value is provided to the user equipment, it may be able to prevent the above problem generated from the bundled ACK/NACK transmission.

FIG. 18 is a diagram for one example of DAI field indicating a combination of a total sum value ($n_{total}$) and an order value ($n_{index}$) [i.e., configured by joint coding PDCCH total sum value and PDCCH order value together] according to a 5$^{th}$ embodiment of the present invention. Referring to FIG. 18, if a threshold ($N_{th}$) is set to 4 for example, every combination of a total sum value ($n_{total}$) and an order value ($n_{index}$) for every order value ($n_{index}$) in case of the total sum value ($n_{total}$) set to 4 is mapped to the DAI value '6' and every combination of a total sum value ($n_{total}$) and an order value ($n_{index}$) for every order value ($n_{index}$) in case of the total sum value ($n_{total}$) set to 5 is mapped to the DAI value '7'. FIG. 18 (a) corresponds to a case that a start value of an order value is set to 1. In this case, a DAI value may be represented as Formula 10. FIG. 18 (b) corresponds to a case that a start value of an order value is set to 0. In this case, a DAI value may be represented as Formula 11.

if $n_{total}<N_{th}$ $DAI=n_{total}(n_{total}-1)/2+n_{index}-1$ elseif $n_{total} \geq N_{th}$ $DAI=N_{th}(N_{th}-1)/2+n_{total}-N_{th}$ [Formula 10]

If $n_{total}<N_{th}$ $DAI=n_{total}(n_{total}-1)/2+n_{index}$ elseif $n_{total} \geq N_{th}$ $DAI=N_{th}(N_{th}-1)/2+n_{total}-N_{th}$ [Formula 11]

Meanwhile, the aforementioned example relates to the case of, if the total sum value ($n_{total}$) is equal to or greater that the threshold ($N_{th}$), the combinations of the total sum value ($n_{total}$) and the order value ($n_{index}$) are mapped to the same DAI duplicatively. Yet, if the total sum value ($n_{total}$) exceeds the threshold ($N_{th}$), the combinations of the total sum value ($n_{total}$) and the order value ($n_{index}$) may be mapped to the same DAI duplicatively according to the same principle. The threshold ($N_{th}$) may be set equal or different for each order value ($n_{index}$). The threshold index ($N_{th}$) may be explicitly signaled to a user equipment. Alternatively, the threshold ($N_{th}$) may be an implicitly set value (e.g., a fixed value under a specific condition).

6$^{th}$ Embodiment

The 6$^{th}$ embodiment relates to a method of transmitting PDCCH total sum value ($n_{total}$) only under the condition that the PDCCH total sum value ($n_{total}$) equal to the maximum schedulable PDCCH number ($N_{max}$) or using a DAI value duplicatively under the condition that PDCCH order value ($n_{index}$) is equal to or greater than a prescribed threshold ($N_{th,index}$).

According to the 6$^{th}$ embodiment, like the aforementioned 3$^{rd}$ embodiment, if $n_{total}=N_{max}$, the same DAI is duplicatively mapped irrespective of $n_{index}$. If $n_{total}<N_{max}$, a threshold ($N_{th,index}$) for PDCCH order value is set. And, if $n_{index} \geq N_{th,index}$ a DAI value previously used for another combination of total sum value and order value may be usable duplicatively. For the DAI value duplicative combinations, combinations having low probability of simultaneous error occurrence in-between may be selected. Therefore, it may be able to reduce an information size necessary to transmit the DAI value.

FIG. 19 is a diagram for one example of DAI field indicating a combination of a total sum value and an order value including an order value ($n_{index}$) equal to or greater that a threshold ($N_{th,index}$) [i.e., configured by joint coding PDCCH total sum value and PDCCH order value together] according to a 6$^{th}$ embodiment of the present invention, in which a DAI value used for combinations of total sum and order values spaced farthest apart from each other is applied. FIG. 19 (a) corresponds to a case that a start value of an order value is set to 1. FIG. 19 (b) corresponds to a case that a start value of an order value is set to 0. In the example shown in FIG. 19 (a), if a threshold ($N_{th,index}$) is set to 3, the DAI values '0', '1' and '2' used for the combinations (1, 1), (2, 1) and (2, 2) of the total sum value and the order value may be duplicatively usable for the combinations (3, 3), (4, 3) and (4, 4) of the total sum value and the order value.

FIG. 20 is a diagram for one example of DAI field indicating a combination of a total sum value and an order value including an order value ($n_{index}$) equal to or greater that a threshold ($N_{th,index}$) [i.e., configured by joint coding PDCCH total sum value and PDCCH order value together] according to a 6$^{th}$ embodiment of the present invention, in which a DAI value used for an order value not exceeding a threshold used for the same total sum value is applied. FIG. 20 (a) corresponds to a case that a start value of an order value is set to 1. FIG. 20 (b) corresponds to a case that a start value of an order value is set to 0. In the example shown in FIG. 19 (a), if a threshold ($N_{th,index}$) is set to 3, the DAI values '3', '5' and '6' used for the combinations (3, 1), (4, 1) and (4, 2) of the total sum value and the order value may be duplicatively usable for the combinations (3, 3), (4, 3) and (4, 4) of the total sum value and the order value.

Meanwhile, the aforementioned example relates to the case of, if the order value ($n_{index}$)$_{is}$ equal to or greater than the threshold ($N_{th,index}$), the combinations of the total sum value ($n_{total}$) and the order value ($n_{index}$) are mapped to the same DAI duplicatively. Yet, if the order value ($n_{index}$) exceeds the threshold ($N_{th,index}$) the combinations of the total sum value ($n_{total}$) and the order value ($n_{index}$) may be mapped to the same DAI duplicatively according to the same principle. The threshold ($N_{th}$) may be set equal or different for each total sum value ($n_{total}$). The threshold ($N_{th,index}$) may be explicitly signaled to a user equipment. Alternatively, the threshold ($N_{th}$) may be an implicitly set value (e.g., a fixed value under a specific condition).

7th Embodiment

The 7th embodiment relates to a method of transmitting PDCCH total sum value ($n_{total}$) only under the condition that the PDCCH total sum value ($n_{total}$) is equal to or greater than a threshold ($N_{th}$) without transmitting PDCCH order value ($n_{index}$) and using DAI value duplicatively.

According to the aforementioned 4th embodiment, if a total sum value ($n_{total}$) is equal to greater than a threshold ($N_{th}$), the same DAI value is used for all. Hence, it is unable to know what are the PDCCH total sum value ($n_{total}$) and the PDCCH order value ($n_{index}$). If a user equipment does not know the PDCCH total sum value ($n_{total}$) the user equipment is unable to know whether the user equipment normally receives all DL assignment PDCCHs sent by a base station. Hence, the 4th embodiment is disadvantageous in being unable to perform ACK/NACK bundling transmission. To settle this disadvantage, the 5th embodiment has proposed a method of indicating a total sum value ($n_{total}$) only without discriminating order values ($n_{index}$) under the condition that a total sum value ($n_{total}$) is equal to or greater than a threshold ($N_{th}$).

Meanwhile, assuming that a PDCCH reception failure probability is low, a failure probability of simultaneous reception of 3 PDCCHs becomes considerably lower than that of reception of one PDCCH. In particular, when a PDCCH total sum value increases, since the failure probability of simultaneous reception of the increasing number of PDCCHs gets lower, it may be able to consider using a previously used DAI value for the increasing total sum value duplicatively. In doing so, different total sum values indicated by the duplicatively used DAI value may be set to have a big difference as far as possible. If the number of the received PDCCHs is equal to or smaller than a smaller one of the duplicatively mapped total sum values, a user equipment recognizes the smaller total sum value. If the number of the received PDCCHs is greater than the smaller one of the duplicatively mapped total sum values, the user equipment recognizes a bigger total sum value. For instance, if a DAI value used for a total sum value 1 is 0, the same DAI value '0' may be usable for a total sum value 4. For instance, when the user equipment receives a DAI value '0', if the number of PDCCH received by the user equipment is 1, the user equipment may recognize that the total sum value is 1. If the number of PDCCHs received by the user equipment is equal to or greater than 2, the user equipment may recognize that the total sum value is 4. In this case, considering that the failure probability of reception of all PDCCHs is inverse proportional to the number of PDCCHs, the user equipment may detect the PDCCH total sum value correctly in general. Therefore, it may be able to further reduce the information size required for transmitting the DAI value.

Figure 21:
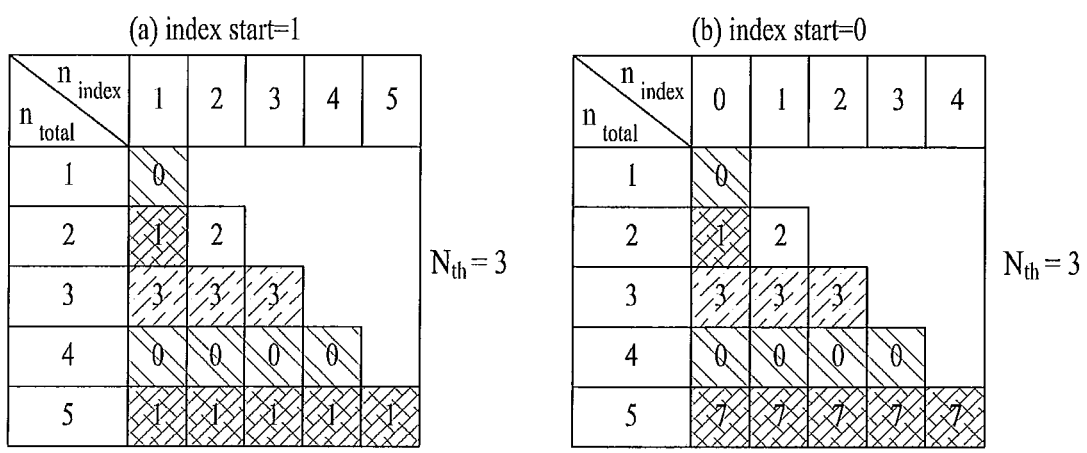
FIG. 21 is a diagram for one example of DAI field according to a $7^{th}$ embodiment of the present invention.

FIG. 21 is a diagram for one example of DAI field indicating a combination of a total sum value ($n_{total}$) and an order value ($n_{index}$) [i.e., configured by joint coding PDCCH total sum value and PDCCH order value together] according to a 7th embodiment of the present invention. FIG. 21 (a) corresponds to a case that a start value of an order value is set to 1. FIG. 21 (b) corresponds to a case that a start value of an order value is set to 0. For instance, in the example shown in FIG. 21 (a), if a threshold ($N_{th}$) is set to 3, a DAI value '3' is assigned to a total sum value 3 irrespective of an order value, a DAI value '0' is assigned to a total sum value 4 irrespective of an order value, and a DAI value '1' is assigned to a total sum value 5 irrespective of an order value. In doing so, a DAI value '0' used for the combination (1, 1) of the total sum value and the order value may be duplicatively used for the total sum value 4 and a DAI value '1' used for the combination (2, 1) of the total sum value and the order value may be duplicatively used for the total sum value 5.

Meanwhile, the aforementioned example relates to the case of, if the total sum value ($n_{total}$) is equal to or greater that the threshold ($N_{th}$), the combinations of the total sum value ($n_{total}$) and the order value ($n_{index}$) are mapped to the same DAI duplicatively. Yet, if the total sum value ($n_{total}$) exceeds the threshold ($N_{th}$), the combinations of the total sum value ($n_{total}$) and the order value ($n_{index}$) may be mapped to the same DAI duplicatively according to the same principle. The threshold ($N_{th}$) may be set equal or different for each order value ($n_{index}$). The threshold ($N_{th}$) may be explicitly signaled to a user equipment. Alternatively, the threshold ($N_{th}$) may be an implicitly set value (e.g., a fixed value under a specific condition).

8th Embodiment

The 8th embodiment relates to a method of mapping the same PDCCH total sum value ($n_{total}$)$_{to}$ a plurality of DAI values and using each of a plurality of the DAI values as information indicating ACK/NACK transmission resource selection.

For instance, the same PDCCH total sum value ($n_{total}$) is mapped to 2 DAI values and each of the 2 DAI values may be able to indicate each of 2 kinds of ACK/NACK transmission resources. In this case, the ACK/NACK transmission resources may be discriminated from each other by the two kinds of different types, respectively. For instance, when an ACK/NACK transmission resource is selected, a 1st transmission resource means an ACK/NACK transmission resource used in transmitting ACK/NACK information by adaptively applying a code rate on the same ACK/NACK transmission resource in accordance with the number of ACK/NACK informations to be actually transmitted. And, a 2nd transmission resource means an ACK/NACK transmission resource used in transmitting ACK/NACK information by PUCCH format 1A or PUCCH format 1B on PUCCH resource corresponding to PDCCH CCE index as defined in the conventional 3GPP LTE system.

Figure 22:
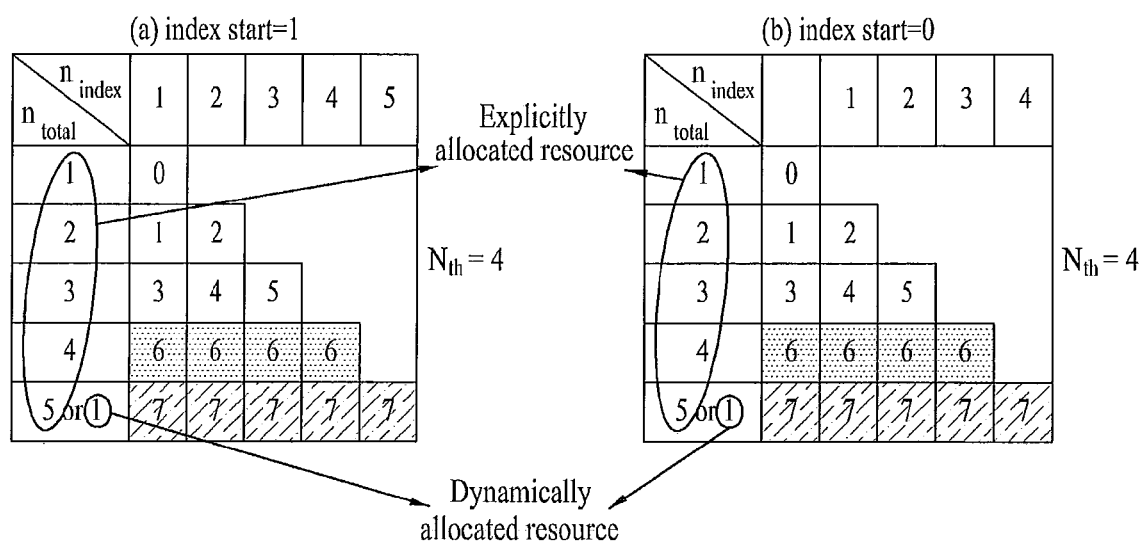
FIG. 22 is a diagram for one example of DAI field according to an $8^{th}$ embodiment of the present invention.

FIG. 22 is a diagram for one example of DAI field indicating a combination of a total sum value ($n_{total}$) and an order value ($n_{index}$) [i.e., configured by joint coding PDCCH total sum value and PDCCH order value together] according to an 8th embodiment of the present invention. FIG. 22 (a) corresponds to a case that a start value of an order value is set to 1. FIG. 22 (b) corresponds to a case that a start value of an order value is set to 0. FIG. 22 basically shows one example of mapping the combinations of the total sum value and the order value to DAI values and additionally mapping the same total sum value to 2 DAI values, by the method of transmitting the PDCCH total sum value ($n_{total}$) only without transmitting the PDCCH order value ($n_{index}$) under the condition that the PDCCH total sum value ($n_{total}$) is equal to or greater than the prescribed threshold ($N_{th}$), as explained in the description of the 5th embodiment with reference to FIG. 18. For instance, in the example shown in FIG. 22 (a), each of the DAI value '0' and the DAI value '7' may indicate the same total sum value ($n_{total}$) 1. In particular, the DAI value '7' may be set to indicate both of the total sum values 1 and having a big difference in-between as similar to the aforementioned 7th embodiment. In more particular, when a user equipment receives the DAI value '7', if the number of PDCCH received by the user equipment is 1, the user equipment may recognize that the total sum value is 1. If the number of PDCCHs received by the user equipment is equal to or greater than 2, the user equipment may recognize that the total sum value is 5. Simultaneously, it may be able to represent that 2 different DAI values '0' and '7' are assigned for the same PDCCH total sum value 1.

In doing so, the selection of ACK/NACK transmission resource may be determined in accordance with the DAI value.

For instance, when a user equipment receives the DAI value '0, if the PDCCH total sum value is 1, the user equipment may be able to recognize that a $1^{st}$ transmission resource will be selected as the ACK/NACK transmission resource. In particular, the DAI value '0' may indicate a case that a method of applying an adaptive code rate on the same resource of a case that DAI value corresponds to one of '1', '2', '3', '4', '5', '6' and '7' (i.e., the case that the total sum value is 5). This is represented as an explicitly allocated resource in FIG. 22.

Meanwhile, when a user equipment receives a DAI value '7' and recognizes that a PDCCH total sum value is 1, it may be able to recognize that a $2^{nd}$ transmission resource will be selected as an ACK/NACK transmission resource. In particular, the DAI value '7' (in case that a total sum value is 1) may indicate a method of performing transmission by PUCCH format 1A/1B by falling back on to PUCCH resource corresponding to PDCCH CCE index unlike the case that DAI values are '1', '2', '3', '4', '5', '6' and '7' (i.e., the case that the total sum value is 5). This is represented as a dynamically allocated resource in FIG. 22.

Alternatively, if a DAI value is 1 and a PDCCH total sum value is 1, a $2^{nd}$ transmission resource may be selected as an ACK/NACK transmission resource. Alternatively, if a DAI value is 7 and a PDCCH total sum value is 1, a $1^{st}$ transmission resource may be selected as an ACK/NACK transmission resource.

The '$N_{max}$=5' is taken as an example for the descriptions of the $1^{st}$ to $8^{th}$ embodiments, by which the present invention may be non-limited. In case that the $N_{max}$ has another integer value, the combination of the PDCCH total sum value ($n_{total}$) and the PDCCH order value ($n_{index}$) can be total, efficiently transmitted by the same principle mentioned in one of the foregoing descriptions of the former embodiments using the minimum bit number of the DAI field. Therefore, the user equipment may be able to correctly create and transmit the ACK/NACK information on the received PDSCH.

Figure 23:
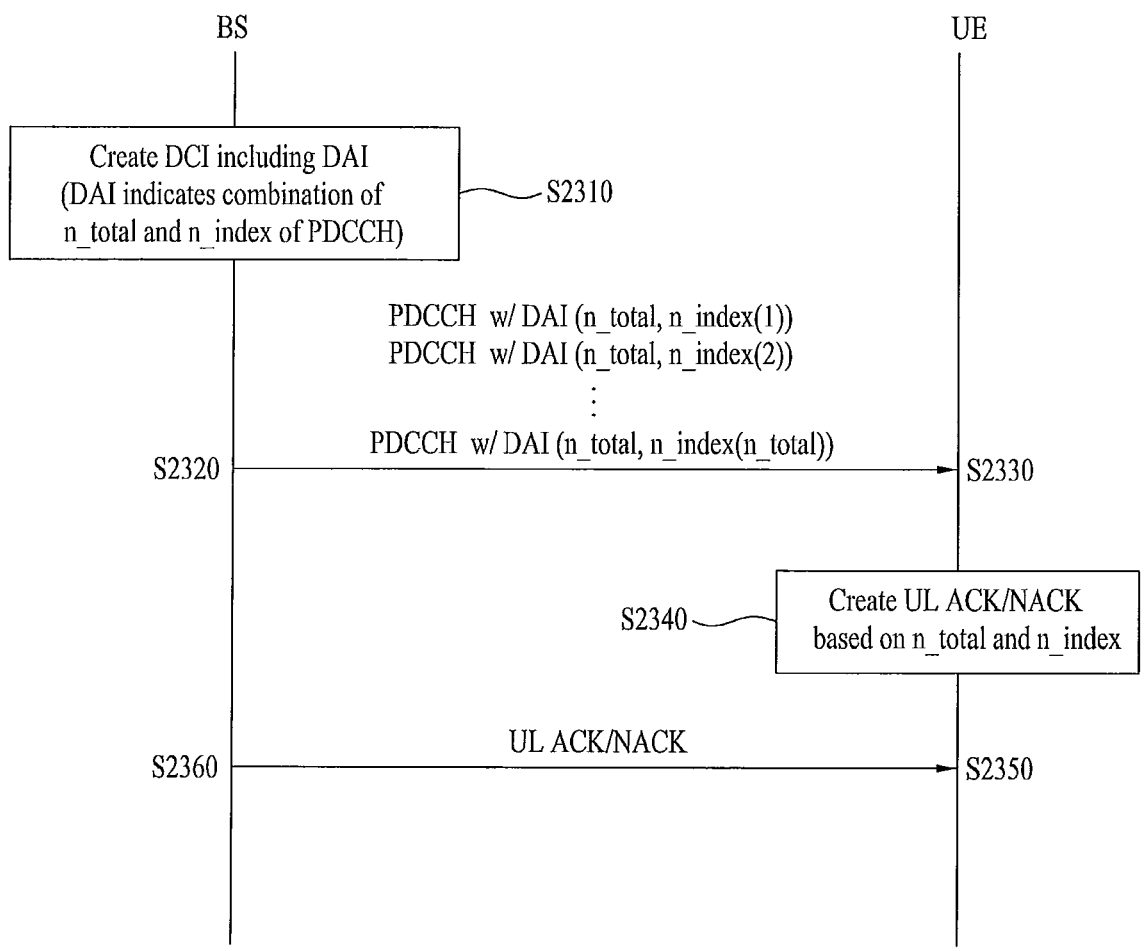
FIG. 23 is a flowchart for a method of transmitting and receiving DAI information and UL ACK/NACK information according to one embodiment of the present invention.

FIG. 23 is a flowchart for a method of transmitting and receiving downlink assignment index (DAI) information and uplink acknowledgement/negative-acknowledgement (UL ACK/NACK) information according to one embodiment of the present invention. Although FIG. 23 shows a base station and a user equipment, the same method shown in FIG. 23 is applicable between a base station and a relay node or between a relay node and a user equipment.

In the step S2310, a base station may be able to create a downlink control information (DCI) including a downlink index assignment index (DAI) information. In this case, the DAI information may have at least one or more states and may be configured with a field having a size capable of indicating one of the at least one or more states. And, each state of the DAI field, i.e., a DAI value may be able to indicate either a total sum value ($n_{total}$) or an order value ($n_{index}$) of PDCCH. In this case, the PDCCH may mean a PDCCH that triggers UL ACK/NACK and may include a PDCCH for scheduling a PDSCH transmission and a PDCCH indicating SPS-release. In particular, when a base station transmits at least one PDCCH triggering UL ACK/NACK, the base station creates a DAI indicating a combination of the number of PDCCH and an order value of each PDCCH and enables the created DAI to be included in each PDCCH. In dong so, different combinations of the PDCCH number and the PDCCH order value may be duplicatively mapped to one DAI value (cf. the aforementioned $3^{rd}$ to $8^{th}$ embodiments). Therefore, it may be able to decrease a size of DAI information.

In the step S2320, the base station may be able to transmit the at least one PDCCH including the created DAI to the user equipment. In particular, each of the at least one PDCCH may include the DAI value indicating the combination of the PDCCH number and the PDCCH order value. In the step S2330, the user equipment may be able to receive at least one or more PDCCHs from the base station.

In the step S2340, the user equipment may be able to acquire the total number of the PDCCHs and the order value of the corresponding PDCCH from the DAI included in the each PDCCH. Based on the PDCCH total number and the PDCCH order values, the user equipment may be able to create UL ACK/NACK information. Even if the user equipment fails in detecting at least one PDCCH from a plurality of PDCCHs, the user equipment may be able to determine the number of UL ACK/NACK's, which are to be created, from the PDCCH number ($n_{total}$) information and may be able to recognize what is the detection-failure PDCCH from the received PDCCH order value ($n_{index}$). Therefore, the user equipment may be able to determine the UL ACK/NACK information accurately and efficiently based on the DAI information.

In the step S2350, the user equipment may be able to transmit UL ACK/NACK signal to the base station based on the created UL ACK/NACK information. In particular, the UL ACK/NACK signal may be transmitted through a conventional PDCCH format, via multiple PUCCHs, or on extended PUCCH resource. Alternatively, the UL ACK/NACK signal may be transmitted in a manner of being piggybacked on PUSCH. Moreover, ACK/NACK bundling may be applicable thereto.

In the step S2360, the base station may be able to receive the UL ACK/NACK signal from the user equipment and may be then able to perform a subsequent operation such as a retransmission of PDSCH and the like.

In the DAI information and UL ACK/NACK transmitting and receiving method according to the present invention described with reference o FIG. 23, the matters of the various embodiments (i.e., $1^{st}$ to $8^{th}$ embodiments) of the present invention mentioned in the foregoing description are independently applicable or at least two of the various embodiments of the present invention may be simultaneously applicable. And, duplicate contents may be omitted for clarity.

Figure 24:
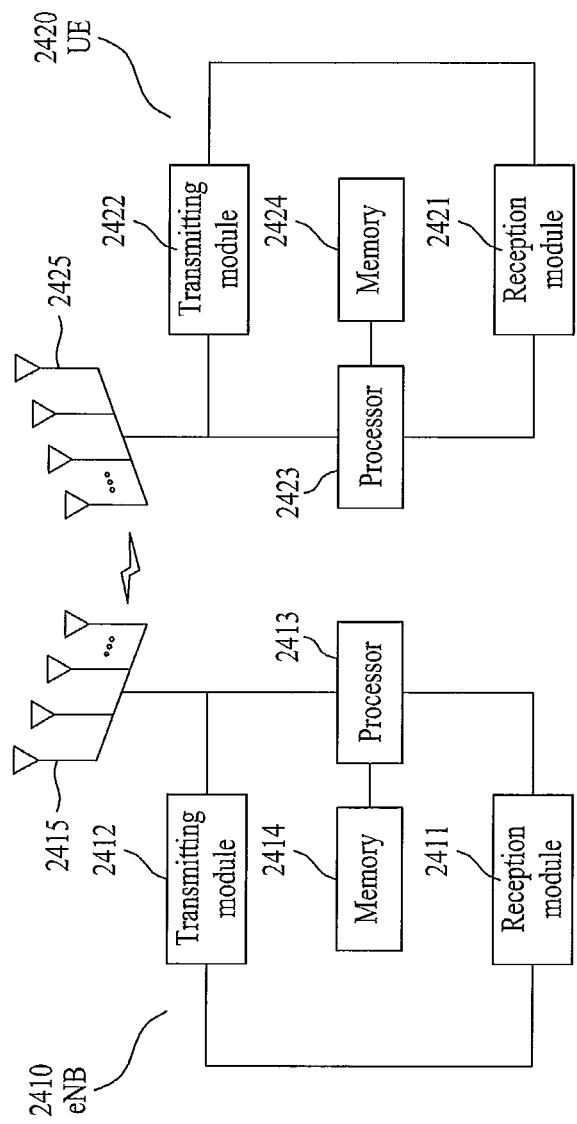
FIG. 24 is a diagram for configurations of a base station device and a user equipment device according to a preferred embodiment of the present invention.

FIG. 24 is a diagram for configurations of a base station device and a user equipment device according to the present invention.

Referring to FIG. 24, a base station device (eNB) 2410 according to the present invention may include a receiving module 2411, a transmitting module 2412, a processor 2413, a memory 2414 and a plurality of antennas 2415. In this case, a plurality of the antennas 2415 may mean a base station device that supports MIMO transmission and reception. The receiving module 2411 may be able to receive various signals, data, information and the like in uplink from a user equipment. The transmitting module 2412 may be able to transmit various signals, data, information and the like in DL to the user equipment. Moreover, the processor 2413 may be configured to control overall operations of the base station device 2410.

The base station device 2410 according to one embodiment of the present invention is able to operate in a multicarrier supportive wireless communication system and may be configured to transmit downlink assignment index (DAI) information to the user equipment and to receive uplink acknowledgement/negative-acknowledgement (UL ACK/NACK) information from the user equipment. The processor 2413 of the base station device 2410 may be configured to create DAI information indicating a combination of the PDCCH number ($n_{total}$) and the PDCCH order value ($n_{index}$). And, the processor 2413 may be configured to transmit a downlink control information (DCI) including the created DAI information via the transmitting module. Moreover, the processor 2413 may be configured to receive the UL ACK/NACK information created by the user equipment via the receiving module based on the PDCCH number ($n_{total}$) and the PDCCH order value ($n_{index}$) indicated by the DAI information. In this case, the DAI information may include a value to which different combinations of the PDCCH number ($n_{total}$) and the PDCCH order value ($n_{index}$) are duplicatively mapped.

The processor 2413 of the base station device 2410 performs a function of operating information received by the user equipment device, information to be externally transmitted and the like. The memory 2414 may be able to store the operated information and the like for prescribed duration and may be substituted with such a component as a buffer (not shown in the drawing) and the like.

Referring to FIG. 24, a user equipment device (UE) 2420 according to the present invention may include a receiving module 2421, a transmitting module 2422, a processor 2423, a memory 2424 and a plurality of antennas 2425. In this case, a plurality of the antennas 2425 may mean a user equipment device that supports MIMO transmission and reception. The receiving module 2421 may be able to receive various signals, data, information and the like in downlink from the base station. The transmitting module 2422 may be able to transmit various signals, data, information and the like in UL to the base station. Moreover, the processor 2423 may be configured to control overall operations of the user equipment device 2420.

The user equipment device 2420 according to one embodiment of the present invention is able to operate in a multicarrier supportive wireless communication system and may be configured to receive downlink assignment index (DAI) information to the user equipment and to transmit UL ACK/NACK information to the base station. The processor 2423 of the user equipment 2420 may be configured to receive DAI information indicating a combination of the PDCCH number ($n_{total}$) and the PDCCH order value ($n_{index}$) via the receiving module. And, the processor 2423 may be configured to create UL ACK/NACK information based on the PDCCH number ($n_{total}$) and the PDCCH order value ($n_{index}$) indicated by the DAI information and to transmit the created UL ACK/NACK information via the transmitting module. In this case, the DAI information may include a value to which different combinations of the PDCCH number ($n_{total}$) and the PDCCH order value ($n_{index}$) are duplicatively mapped.

The processor 2423 of the user equipment device 2420 performs a function of operating information received by the user equipment device, information to be externally transmitted and the like. The memory 2424 may be able to store the operated information and the like for prescribed duration and may be substituted with such a component as a buffer (not shown in the drawing) and the like.

The detailed configurations of the base station device and the user equipment device mentioned in the above description may be implemented in a manner that the matters of the various embodiments (i.e., $1^{st}$ to $8^{th}$ embodiments) of the present invention mentioned in the foregoing description are independently applicable or that at least two of the various embodiments of the present invention are simultaneously applicable. And, duplicate contents may be omitted for clarity.

In the description with reference to FIG. 24, the description of the base station device 2410 may be identically applicable to a relay device as a DL transmission entity or a UL reception entity. And, the description of the user equipment device 2420 may be identically applicable to a relay device as a DL reception entity or a UL transmission entity.

Embodiments of the present invention may be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The embodiments of the present invention mentioned in the foregoing description may be applicable to various kinds of multicarrier supportive mobile communication systems.

What is claimed is:

1. A method of transmitting uplink acknowledgement/negative-acknowledgement (UL ACK/NACK) information, which is transmitted by a user equipment in a multicarrier supportive wireless communication system, the method comprising:

receiving a downlink control information including a downlink assignment index (DAI) information indicating a combination of a total number ($n_{total}$) of downlink control channels and an order value ($n_{index}$) of the downlink control channels, wherein the total number ($n_{total}$) of the downlink control channels indicates total number of downlink control channels over all of carriers configured to the user equipment; and transmitting the UL ACK/NACK information based on the total number ($n_{total}$) of the downlink control channels and the order value ($n_{index}$) of the downlink control channels indicated by the DAI information, wherein the DAI information indicates a DAI value among a plurality of DAI values, wherein the plurality of DAI values includes at least one DAI value such that different combinations of the total number ($n_{total}$) of f the downlink control channels and the order value ($n_{index}$) of the downlink control channels are mapped duplicatively to a same DAI value, and wherein the DAI information has a value of DAI=$n_{total}$($n_{total}$−1)/2+$n_{index}$−1 if $n_{total}$<$N_{th}$ and wherein the DAI information has a value of DAI=$N_{th}$($N_{th}$−1)/2+$n_{total}$−$N_{th}$ if $n_{total}$≥$N_{th}$, wherein the $N_{th}$ is a predetermined natural number, and wherein the order value ($n_{index}$) of the downlink control channel has a value of a natural number equal to or smaller than $n_{index}$.

2. The method of claim 1, wherein if the DAI information indicates that the total number ($n_{total}$) of the downlink control channels is a maximum number and the user equipment receives one downlink control channel, the UL ACK/NACK information is transmitted via an uplink control channel resource corresponding to a control channel element index of the one downlink control channel.

3. The method of claim 1, wherein the total number ($n_{total}$) of the downlink control channels comprises a value amounting to a sum of the number of the downlink control channels assigning downlink data channels and the number of the downlink control channels requiring ACK/NACK for whether the corresponding downlink control channel is detected.

4. The method of claim 3, wherein when the downlink control channel assigns the downlink data channels, the UL ACK/NACK information is created based on whether the downlink data channel is received.

5. The method of claim 1, wherein the total number ($n_{total}$) of the downlink control channels comprises a value amounting to a sum of the number of downlink data channels and the number of the downlink control channels requiring ACK/NACK for whether the corresponding downlink control channel is detected.

6. The method of claim 1, wherein the total number ($n_{total}$) of the downlink control channels comprises a value amounting to a sum of the number of downlink control channels assigning downlink data channels, the number of the downlink data channels scheduled without the downlink control channels, and the number of the downlink control channels requiring ACK/NACK for whether the corresponding downlink control channel is detected.

7. The method of claim 6, wherein the downlink data channel scheduled without the downlink control channel comprises the downlink data channel scheduled by semi-persistent scheduling (SPS).

8. The method of claim 1, wherein the total number ($n_{total}$) of the downlink control channels comprises the number of the downlink control channels transmitted to the user equipment in a prescribed time interval.

9. A method of transmitting downlink control information, which is transmitted by a base station in a multicarrier supportive wireless communication system, the method comprising:

creating a downlink assignment index (DAI) information indicating a combination of a total number ($n_{total}$) of downlink control channels and an order value ($n_{index}$) of the downlink control channels, wherein the total number ($n_{total}$) of the downlink control channels indicates total number of downlink control channels over all of carriers configured to the user equipment; and transmitting a downlink control information including the created downlink assignment index information, wherein the total number ($n_{total}$) of the downlink control channels and the order value ($n_{index}$) of the downlink control channels indicated by the DAI information is used for creation of uplink acknowledgement/negative-acknowledgement (UL ACK/NACK) information, wherein the DAI information indicates a DAI value among a plurality of DAI values, and wherein the plurality of DAI values includes at least one DAI value such that different combinations of the total number ($n_{total}$) of f the downlink control channels and the order value ($n_{index}$) of the downlink control channels are mapped duplicatively to a same DAI value, and wherein the DAI information has a value of DAI=$n_{total}$($n_{total}$−1)/2+$n_{index}$−1 if $n_{total}$<$N_{th}$ and wherein the DAI information has a value of DAI=$N_{th}$($N_{th}$−1)/2+$n_{total}$−$N_{th}$ if $n_{total}$≥$N_{th}$, wherein the $N_{th}$ is a predetermined natural number, and wherein the order value ($n_{index}$) of the downlink control channel has a value of a natural number equal to or smaller than $n_{index}$.

10. A user equipment, which transmits uplink (UL) acknowledgement/negative-acknowledgement (ACK/NACK) information, the user equipment comprising:

a receiving module configured to receive a downlink signal from a base station;

a transmitting module configured to transmit an uplink signal to the base station; and a processor configured to:

control the receiving module and the transmitting module, receive a downlink control information including a downlink assignment index (DAI) information indicating a combination of a total number ($n_{total}$) of downlink control channels and an order value ($n_{index}$) of the downlink control channels via the receiving module, and transmit the UL ACK/NACK information via the transmitting module based on the total number ($n_{total}$) of f the downlink control channels and the order value ($n_{index}$) of the downlink control channels indicated by the DAI information, wherein the total number ($n_{total}$) of the downlink control channels indicates total number of downlink control channels over all of carriers configured to the user equipment, wherein the DAI information indicates a DAI value among a plurality of DAI values, wherein the plurality of DAI values includes at least one DAI value such that different combinations of the total number ($n_{total}$) of the downlink control channels and the order value ($n_{index}$) of the downlink control channels are mapped duplicatively to a same DAI value, and wherein the DAI information has a value of DAI=$n_{total}$($n_{total}$−1)/2+$n_{index}$−1 if $n_{total}$<$N_{th}$ and wherein the DAI information has a value of DAI=$N_{th}$($N_{th}$−1)/2+$n_{total}$−$N_{th}$ if $n_{total}$≥$N_{th}$, wherein the $N_{th}$ is a predetermined natural number, and wherein the order value ($n_{index}$) of the downlink control channel has a value of a natural number equal to or smaller than $n_{index}$.

11. A base station, which transmits downlink control information in a multicarrier supportive wireless communication system, the base station comprising:
a receiving module configured to receive an uplink signal from a user equipment;
a transmitting module configured to transmit a downlink signal to the user equipment; and
a processor configured to:
control the receiving module and the transmitting module,
create a downlink assignment index (DAI) information indicating a combination of a total number ($n_{total}$) of downlink control channels and an order value ($n_{index}$) of the downlink control channels, and
transmit the downlink control information including the created DAI information, wherein the total number ($n_{total}$) of the downlink control channels indicates total number of downlink control channels over all of carriers configured to the user equipment, wherein the total number ($n_{total}$) of the downlink control channels and the order value ($n_{index}$) of the downlink control channels indicated by the DAI information are used for creation of uplink acknowledgement/negative-acknowledgement (UL ACK/NACK) information in the user equipment, wherein the DAI information indicates a DAI value among a plurality of DAI values, wherein the plurality of DAI values includes at least one DAI value such that different combinations of the total number ($n_{total}$) of the downlink control channels and the order value ($n_{index}$) of the downlink control channels are mapped duplicatively to a same DAI value, and wherein the DAI information has a value of DAI=$n_{total}$($n_{total}$−1)/2+$n_{index}$−1 if $n_{total}$<$N_{th}$ and wherein the DAI information has a value of DAI=$N_{th}$($N_{th}$−1)/2+$n_{total}$−$N_{th}$ if $n_{total}$≥$N_{th}$, wherein the $N_{th}$ is a predetermined natural number, and wherein the order value ($n_{index}$) of the downlink control channel has a value of a natural number equal to or smaller than $n_{index}$.

* * * * *